United States Patent
Rasheed

(10) Patent No.: US 10,685,472 B1
(45) Date of Patent: Jun. 16, 2020

(54) ANIMATION BRUSHES

(71) Applicant: Adobe Inc., San Jose, CA (US)

(72) Inventor: Fabin Rasheed, Alleppey (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/264,385

(22) Filed: Jan. 31, 2019

(51) Int. Cl.
  *G06T 13/80* (2011.01)
  *G06T 11/60* (2006.01)
  *G06T 11/20* (2006.01)
  *G06T 11/00* (2006.01)

(52) U.S. Cl.
  CPC .......... *G06T 13/80* (2013.01); *G06T 11/203* (2013.01); *G06T 11/60* (2013.01); *G06T 11/001* (2013.01); *G06T 2200/24* (2013.01)

(58) Field of Classification Search
  CPC ......... G06T 13/80; G06T 13/00; G06T 15/02; G06T 2200/24; B44F 11/02; B44F 7/00; G06F 3/03545; G06F 3/03547; G06F 3/04883; G06K 9/222; B44D 2/002; A46B 15/0002; A46B 15/0006; A46B 15/0008; G09G 5/026
  See application file for complete search history.

(56) References Cited

U.S. PATENT DOCUMENTS

| | | | |
|---|---|---|---|
| 5,777,619 A | 7/1998 | Brinsmead | |
| 6,348,924 B1* | 2/2002 | Brinsmead | G06T 11/001 345/441 |
| 6,628,295 B2 | 9/2003 | Wilensky | |
| 6,791,573 B2 | 9/2004 | Hamburg | |
| 6,873,327 B1* | 3/2005 | Edwards | G06T 11/60 345/473 |
| 8,605,095 B2 | 12/2013 | DiVerdi et al. | |
| 2006/0268015 A1 | 11/2006 | Georgiev et al. | |
| 2010/0188409 A1* | 7/2010 | Ooba | G06F 3/0488 345/473 |

OTHER PUBLICATIONS

Screen shots and transcript for YouTube video "#BrushBounty: Adobe MAX 2018 (Sneak Peek) | Adobe Creative Cloud" by Fabin Rasheed, Oct. 17, 2018 on YouTube, https://youtu.be/Q9GUnQvkQOc,(total length of video: 6:50 ).

* cited by examiner

*Primary Examiner* — Haixia Du
(74) *Attorney, Agent, or Firm* — Kilpatrick Townsend & Stockton LLP

(57) ABSTRACT

An image editing program can include animation brushes. An animation brush enables a content creator to draw as with any other digital brush. The animation brush will automatically generate elements, such as hair or raindrops. Each element can be drawn using a set of pixels that have a particular shape, location, and/or color, as determined by parameters associated with the animation brush. The image editing program can further animate the elements by determining, for each frame of an animation sequence, updated shape, location, and/or color values for the pixels of the elements. The image editing program can then redraw the elements. Redrawing of the elements can thus produce an animation.

20 Claims, 29 Drawing Sheets
(18 of 29 Drawing Sheet(s) Filed in Color)

ANIMATION BRUSHES

BACKGROUND

Image editing programs enable digital content creators to draw and/or edit digital images. An image editing program can include a graphical user interface in which a user can view and edit an image. In some examples, the image editing program includes drawing tools, such as pencils, brushes, and erasers, among other examples, each of which can include a number of controllable settings. The image editing program can further include editing tools, such as tools for selecting or deselecting areas of the image, for copying or moving pixels, for adjusting colors, luminance, or chrominance values for pixels, for transforming the size, shape, or orientation of a set of pixels, and other tools. In some examples, an image editing program can provide editing capabilities beyond what is possible using analog media. For example, the image editing program enable an image to be edited in a three-dimensional fashion, using layers. In this example, changes can be made to the pixels in one layer without affecting the pixels in another layer. Alternatively, one layer can affect or control the changes in another layer. Layers can be used for purposes such as these, and/or for many other uses.

The brush tool is one example of the drawing tools that may be available in an image editing program. The brush tool can give a user access to different types of brushes, each of which can have properties such as a size, shape, texture, edge characteristics, and/or various parameters that control the color, location, and/or number of pixels that are placed on the image with each brush stroke. Examples of different types of brushes include ones that mimic a physical paintbrush, and produces lines as would be produced by the hairs of the paintbrush; ones that mimic an airbrush, and places pixels as if sprayed onto the image; and ones that mimic felt-tipped markers, which produce brush strokes with harder edges, among many other examples. In various examples, the image editing tool can also include brushes that operate like stamps, which place copies of a shape on the image as a brush stroke is made. In some examples, the shapes being placed can have random characteristics, which can vary the size, orientation, and/or color (among other parameters) of the shapes being drawn. Once drawn, the pixels placed by the brush tool have a static shape, color, and location.

Tools such as the brush tool enable content creators to draw and paint digital images in an image editing program. To produce animations, the image editing program may enable a sequence of images to be output is a video or in an animated file format (such as the Graphics Interchange Format (GIF)). Alternatively or additionally, images drawn in an image editing tool can be imported into a video or animation editing program, which can enable frame-by-frame editing of a video or animation. In these and other examples, however, the content creator may be required to draw each frame of an animation. The image editing program may provide assistance in the drawing of an object in different positions, and the video editing program may provide assistance in the sequencing of the motions, but it may be left to the content creator to perform the drawing of the object, for each frame in an animation sequence.

BRIEF SUMMARY

In various examples, an image editing program can include animation brushes. An animation brush enables a user to draw or paint in a digital image, just as with any other brush provided by the image editing program. The animation brush, however, automatically generates elements, which are then redrawn at a particular frame rate and according to the parameters associated with the animation brush. The redrawing of the elements thus produces an animation. The user need not draw each frame of the animation. Instead, the frames are generated automatically by the image editing program.

Examples described herein include a computer-implemented method including steps for performing the operations of generating animations using an animation brush; a computing device executing an image editor, the computing device including one or more processors and a non-transitory computer-readable medium including instructions that, when executed by the one or more processors, cause the one or more processors to perform operations for generating animations using an animation brush; and a non-transitory computer-readable medium having stored thereon instructions that, when executed by one or more processors, cause the one or more processors to operations for generating animations using an animation brush. The operations for generating animation using an animation brush can include determining an area of an image included in a brush stroke, wherein a brush used to draw the brush stroke is associated with a set of animation parameters. The operations can further include drawing, for a first frame of an animation sequence, a plurality of elements in the area included in the brush stroke, wherein each element of the plurality of elements includes a set of pixels, the set of pixels having values determined by the set of animation parameters. The operations can further include determining, at a next frame of the animation sequence, updated values for the sets of pixels for the plurality of elements, wherein the updated values are determined using the set of animation parameters. The operations can further include redrawing, for the next frame of the animation sequence, the plurality of elements according to the updated values.

In some aspects, the methods, computing devices, and instructions stored on the non-transitory computer-readable medium can include further operations. These operations can include determining the updated values using a constrained random number generator.

In some aspects, when drawn, one or more elements of the plurality of elements extend beyond the area included in the brush stroke. In some aspects, drawing of the plurality of elements is constrained to the area included in the brush stroke.

In some aspects, redrawing the plurality of elements includes modifying a color value for each set of pixels for the plurality of elements. In some aspects, redrawing the plurality of elements includes drawing one or more elements of the plurality of elements in a new location.

In some aspects, the methods, computing devices, and instructions stored on the non-transitory computer-readable medium can include further operations. These operations can include enabling output of audio data associated with the set of animation parameters.

In some aspects, the methods, computing devices, and instructions stored on the non-transitory computer-readable medium can include further operations. These operations can include determining a data feed associated with the set of animation parameters, wherein the updated values are further determined using the data feed. In some aspects, a source of the data feed is a component of the computing device. In some aspects, a source of the data feed is a network location.

In some aspects, the brush is a digital tool of the image editor, the brush having one or more of a diameter, a shape, or edge characteristics, and wherein application of the brush to the image causes modification of pixels where the brush is applied. In some aspects, the brush stroke is produced by application of the brush to the image, wherein the brush determines a size and shape of the area included in the brush stroke.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative examples are described in detail below with reference to the following figures.

DETAILED DESCRIPTION

Figure 1:
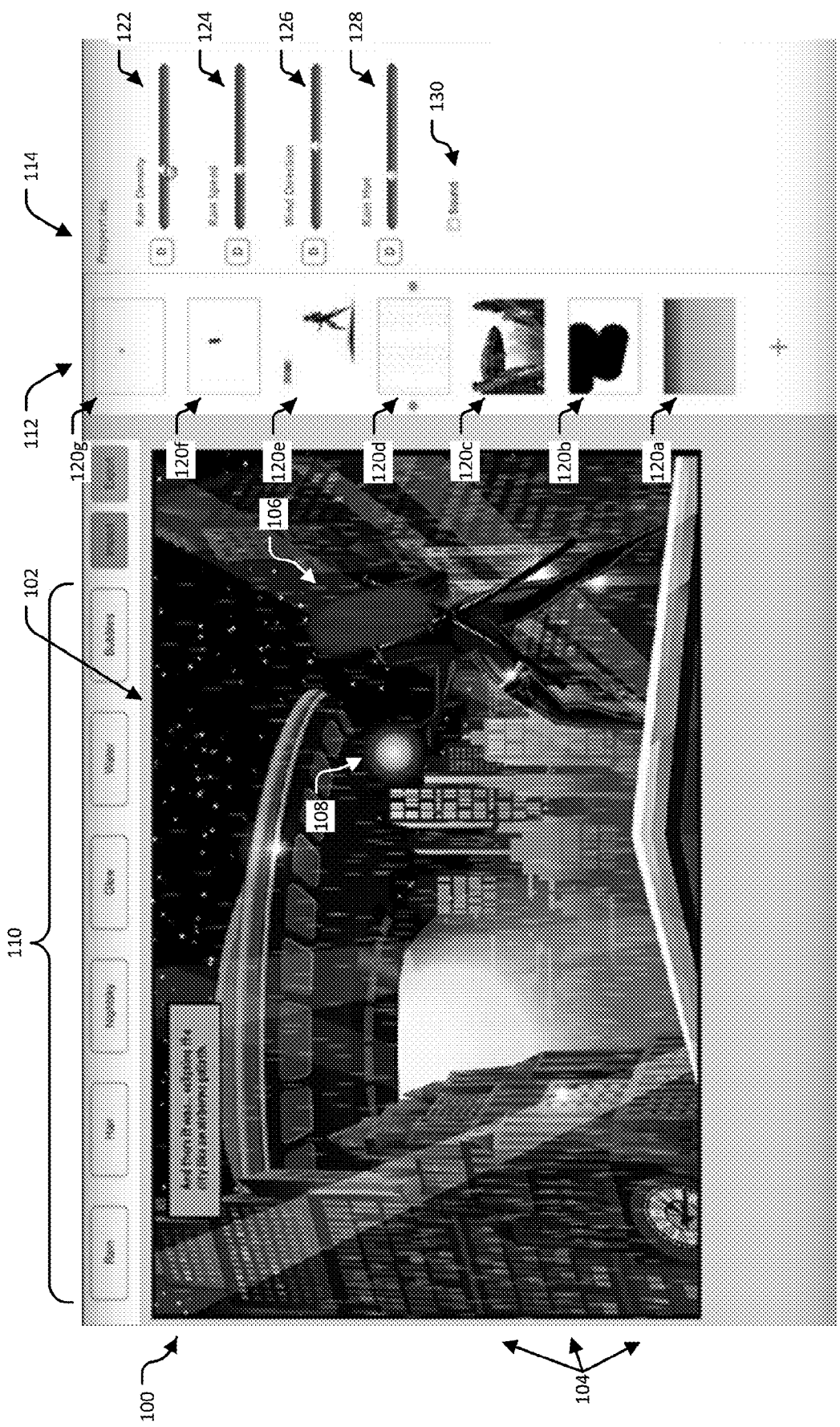
FIG. 1 includes a screenshot of an image editing program, in which an image that includes animated elements is being edited.

In various examples, an image editing program can include animation brushes. An animation brush enables a content creator to draw or paint just as with any other brush. As with some brushes, the animation brush can automatically place pixels in shapes or elements associated with the brush. For example, an animation brush can generate strands of hair, stars, or clouds, depending on the brush that is selected. Unlike other brushes, however, an animation engine associated with the animation brush can automatically animate the shapes or elements drawn by the brush. The animation engine can, for example, redraw the elements in different positions and/or change the colors of the elements to give the perception of movement and/or depth. For example, hair can be animated to move as in a breeze, stars can be made to twinkle, and clouds can be animated to drift across the image, among other examples. In various examples, the animation engine can provide, for each animation brush, a set of controls that enable the user to change the animation. The animation sequence is otherwise fully automated, and is enabled as soon as the user has placed brush strokes on the image.

To generate even short animation sequence, a content creator may need to know not only how to draw, but may also need to have some training in animation. For example, the content creator may need to understand frame rates, and how many animation frames may be needed to illustrate an object moving slowly or quickly. Additionally, the content creator may need to draw each frame of an animation, and in each frame change the shading and gradients on a moving object to correctly portray the movement. The animation process can thus be both difficult and time consuming. Additionally, once the content creator has drawn each frame of the animation, making changes such as changing the direction or speed of a motion, or modifying effects such as lighting and shading, may require redrawing some or all of the frames of the animation.

Animation brushes can enable a content creator to quickly add animations to an image. In various examples, an image editor that includes animation brushes can determine the area encompassed by the brush strokes made using an animation brush, and can automatically draw elements associated with the brush. For example, the image editor can automatically draw strands of hair, bubbles, or other elements. The image editor can then initiate an animation sequence, in which, for each frame of the animation sequence, the image editor (for example, using an animation engine) determines updated values for each element, and then redraws the elements.

With animation brushes, the content creator may not need learn animation techniques, and need not draw each frame of an animation. The content creator need only paint an area that is to contain the animation. Additionally, the image editor can enable the content creator to control the animation. For example, the image editor can provide a control panel that includes controls for a particular animation drawn in an image. In some examples, the controls can be specific to the animation brush that was used to draw the animation, so that the parameters particular to the animation can be controlled. In these and other examples, the control panel can enable a content creator to draw and then modify an animation, without needing to redraw the animation. The content creator also need not resort to a video editing program to make changes to the animation. Animation brushes thus enable quick production of animated digital graphics.

FIG. 1 includes a screenshot of an image editing program, in which an image 100 that includes animated elements is being edited. The example image 100 includes four animations: a night sky that includes stars 102 that twinkle, falling rain 104, hair 106 that moves in the wind, and a glowing orb 108 that pulses. Each of these animations were drawn using a different animation brush. A control panel 110 at the top of the screen enables the user to select from among different animation brushes, which, in the illustrated example, includes a rain brush, a hair brush, a night sky brush, a glow brush, a water brush, and a bubbles brush. In other examples, more or fewer animation brushes may be available.

The example image editing program enables the image 100 to be drawn using multiple layers 120a-120g. A layer control panel 112 enables the user to see and select between the layers 120a-120g. The animations can be drawn in different layers. For example, the night sky was drawn in the second layer 120*b* (the first layer 120*au* being the bottom most layer), the rain 104 was drawn in the fourth layer 120*d*, the hair 106 was drawn in the sixth layer 120*f*, and the glowing orb 108 was drawn in the seventh layer 120*g*. The layers also enable parts of lower layers to be visible or not visible in the image 100. For example, the second layer 120*b*, which includes the night sky, is below a layer (the third layer 120*c*) that includes buildings and other objects, and thus is only visible there are no structures or objects present in the third layer 120*c*. As another example, the layer that includes the rain 104 (the fourth layer 120*d*) is below the layer that includes a person (the fifth layer 120*e*), so that the rain 104 appears to be falling behind where the person is standing.

In various examples, each of the animations can have a set of properties or parameters that can be changed by the user. The image editing program can display the properties or parameters in an animation control panel 114. The animation control panel 114 will display properties or parameters for a particular animation. In the example of FIG. 1, the user has selected the fourth layer 120*d*, which includes the rain 104 animation; thus, the animation control panel 114 has displayed properties for the rain 104 animation that the user can change. In this example, these properties include a rain density 122 (to control how many raindrops are drawn), a rain speed 124 (to control how fast the raindrops fall), a wind direction 126 (to affect the direction in which the raindrops fall), and a rain hue 128 (to change the colors of the raindrops). In some cases, an animation can also include sound. For example, the rain 104 animation can include the sound of falling raindrops, and thus the animation control panel 114 includes a graphical element 130 for turning the sound on or off.

The other example animations can have similar or different properties or parameters. The image editor may display these other properties or parameters in the animation control panel 114 when, for example, the user selects another layer that includes an animation.

In various examples, one or more of the animations in the example image 100 can be linked to a live data feed. In these examples, the image editing program can use data from the data feed to control the parameters of the animations. The data feed may be continuously updating, and/or may update periodically. In some examples, each time the data feed updates, the image editing program can modify the parameters of one or more of the animations to match the data obtained from the data feed. For example, the rain 104 animation can be associated with a weather data feed. In this example, the density of the rain can reflect the current rainfall in a particular city and/or at a particular rainfall monitoring station. As another example, the stars 102 animation can be linked to an astronomic data feed, and can reflect the constellations that may be visible in the night say at a particular latitude and longitude on the globe. In these and other examples, different animations can be controlled by the same data feed or by different data feeds. For example, both the hair 106 and the rain 104 can be linked to a weather data feed, so that both reflect the same wind direction and speed.

Figures 2A, 2B:
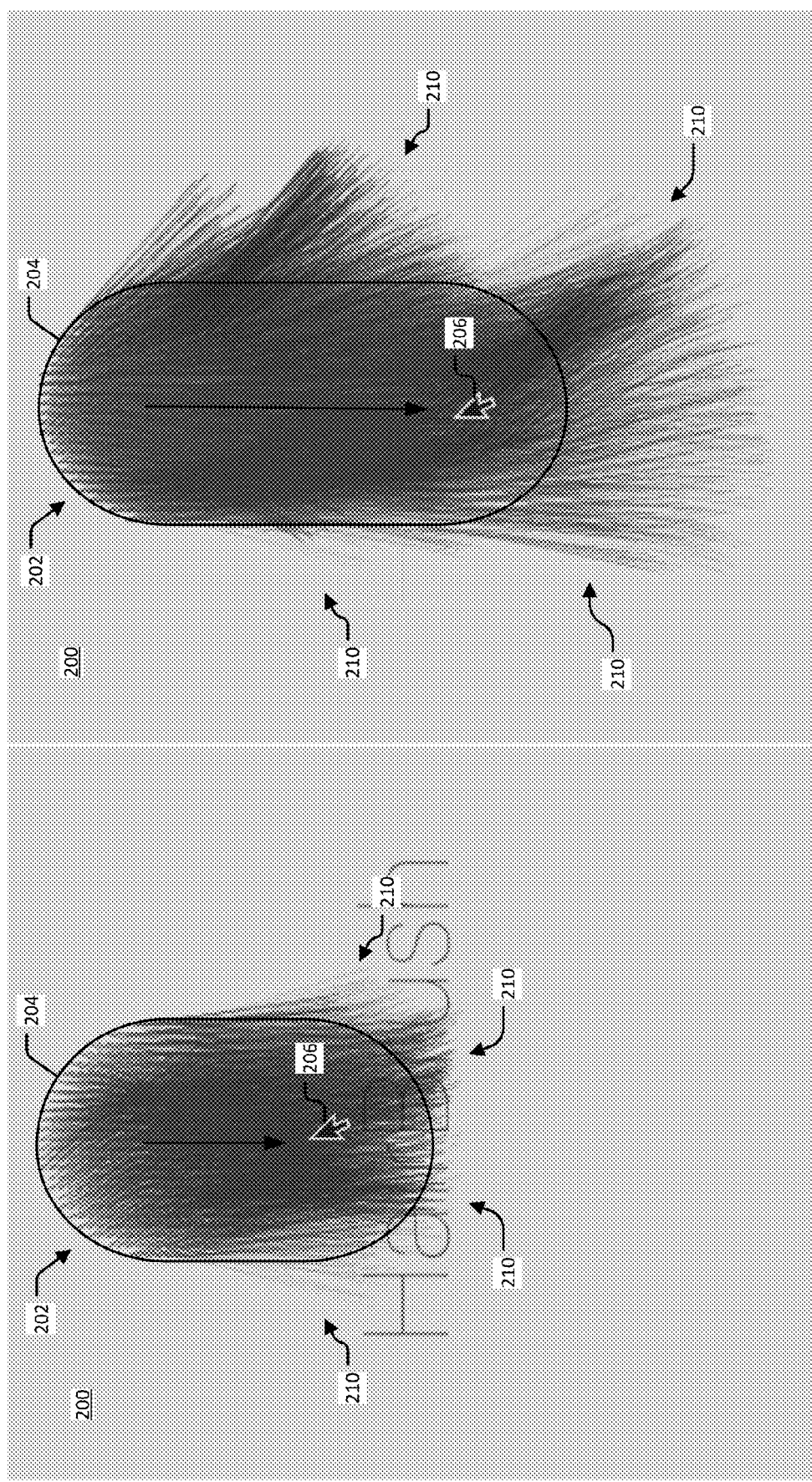
FIGS. 2A-2H include an example image in which an animation has been drawn using an animation brush.
Figures 2C, 2D:
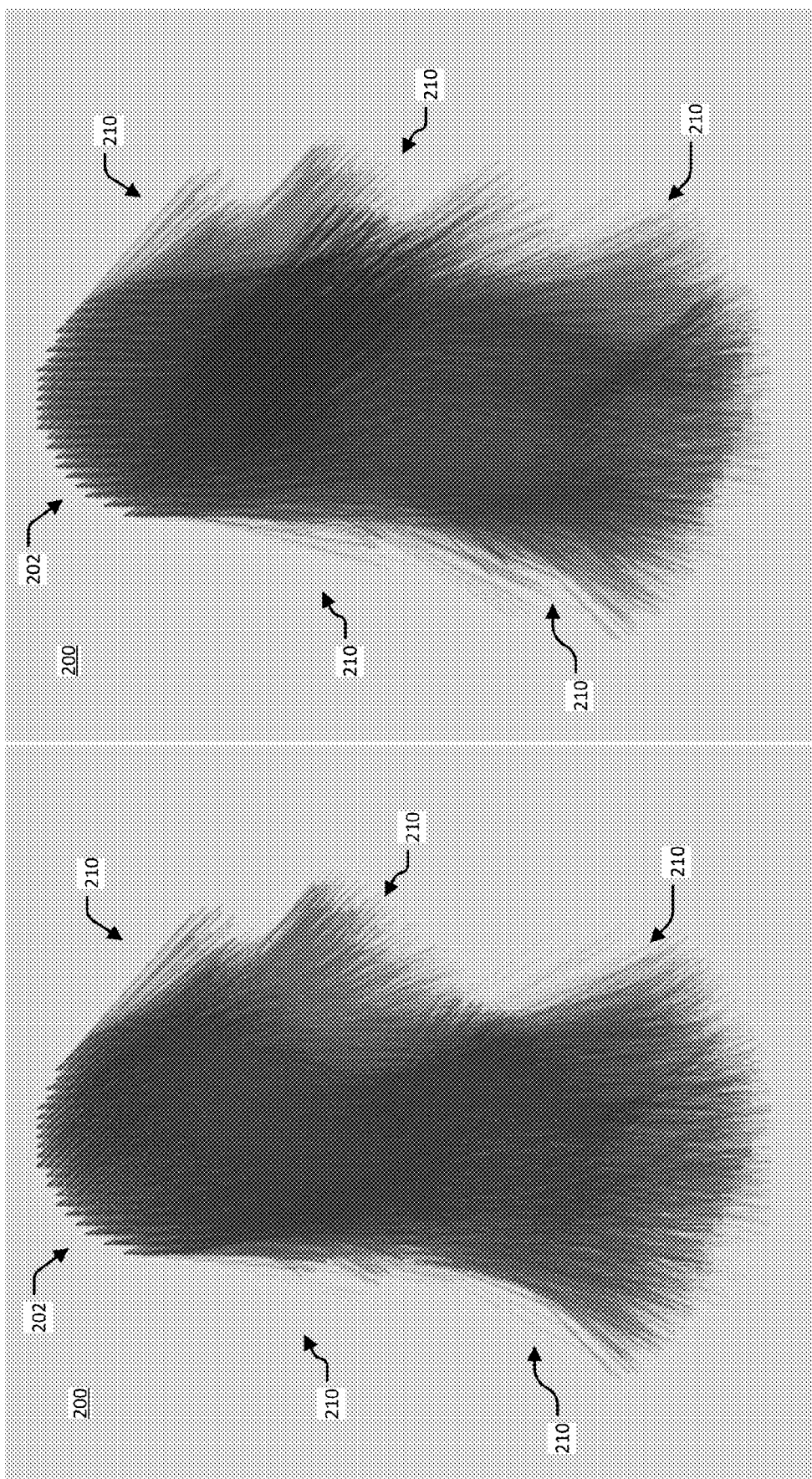
Figures 2E, 2F:
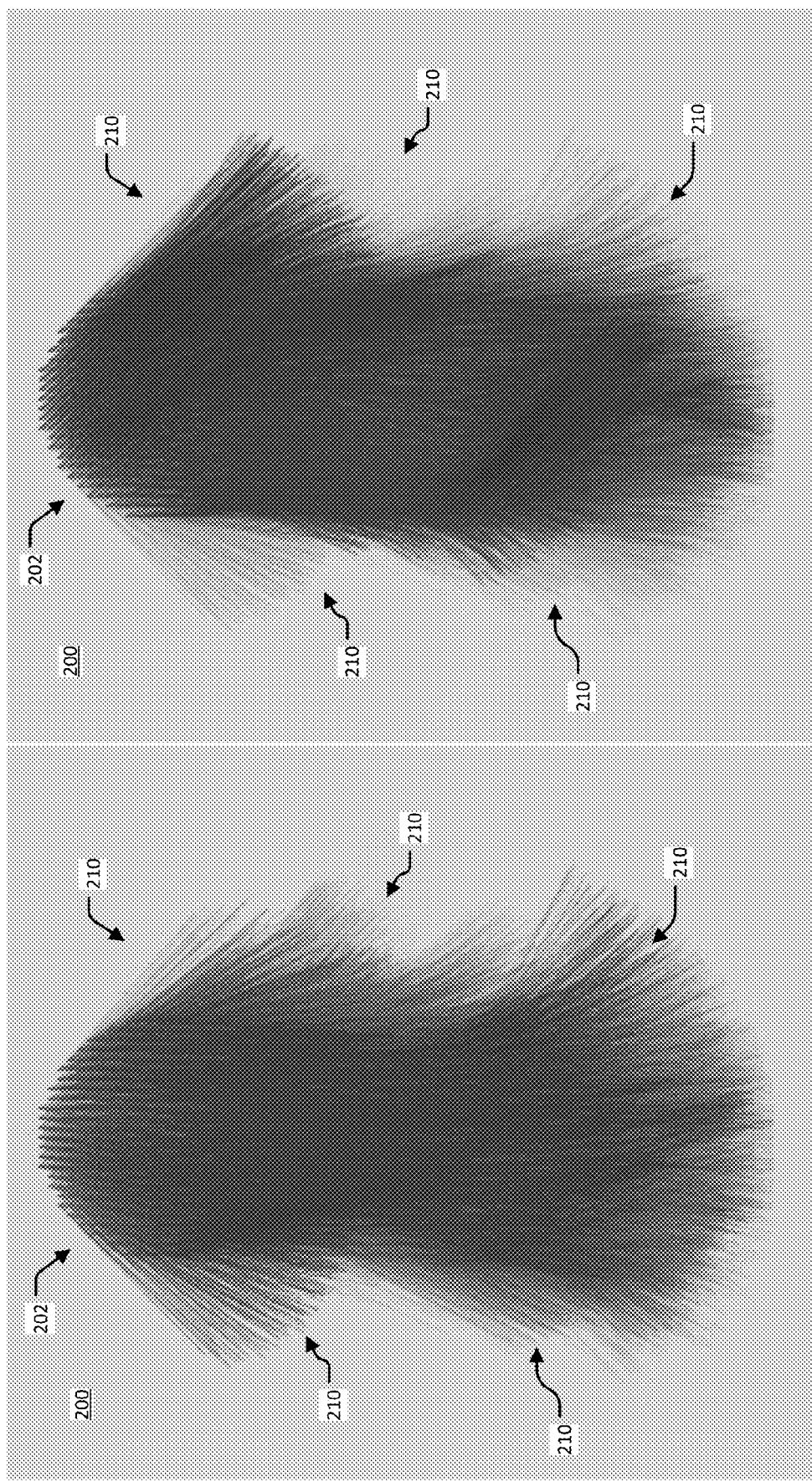
Figures 2G, 2H:
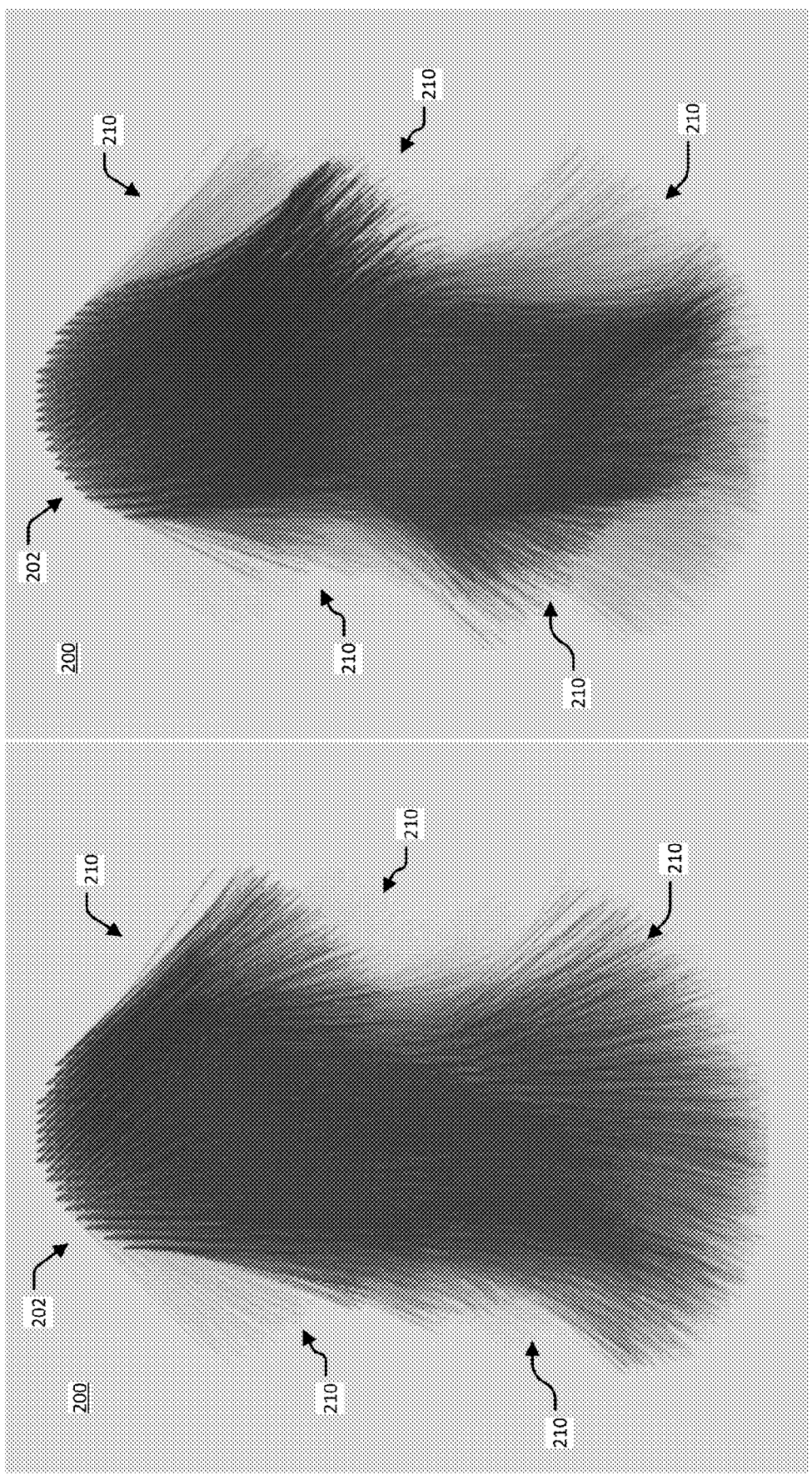

FIGS. 2A-2H include an example image 200 in which an animation 202 has been drawn using an animation brush. In this example image 200, an animation 202 drawn using animation brush for hair is illustrated. To draw the animated hair illustrated in the image 200, a user can, for example, select a brush named "hair brush," or something similar, from a menu of animation brushes. Alternatively or additionally, the user can enable a brush tool, and can specify the animation type (e.g., "hair" in the illustrated example) from a control panel for the brush tool (referred to, in some examples, as a brush presets menu). Once the user has selected the hair brush, the user can draw or paint on the image, for example by selecting an initial location using a pointer 206 and moving the pointer 206 to another location. In the example of FIG. 2A, the user has selected a point near the top of the image, and has moved the pointer 206 down to a second location. The user can perform the illustrated motion, for example, by clicking and "dragging" a mouse (e.g., moving the mouse while holding down a button), or by dragging a stylus, finger, or other capacitive object on a trackpad, touchscreen, or digitizing tablet.

In various examples, the user's input generates a brush stroke 204 on the image 200. The brush stroke 204 defines an area of the image where the "paint" from the brush is placed; that is, an area of the image where the pixel values are changed to reflect colors and/or shapes associated with the brush. A brush can have a size and shape, which, among other parameters, define the shape of the area formed by the brush stroke 204. In the case of FIGS. 2A-2H the brush has a circular shape of a certain diameter, where the diameter can be specified in pixels. In other examples, the brush can have a different shape, such as square, elliptical, or a more complex shape, or can be in the shape of a line, among other examples. By selecting and dragging the pointer 206, the user can generate a continuous brush stroke, and by repeatedly selecting, dragging, and unselecting, the user can generate multiple brush strokes. In some examples, depending on the configuration of the brush or other factors, an image editor can treat adjacent or overlapping brush strokes as a single brush stroke or as separate brush strokes.

In the example image 200, the user used the animation brush for hair to draw the brush stroke 204, and, as a result, the image editor has automatically drawn multiple elements 210, each in the shape of a strand of hair. To draw the hair, in various examples, the animation brush has various drawing parameters, including element shape characteristics, colors, and/or element placement, among other examples. The drawing parameters can have default values, and/or can be set by the user before or after the user draws the brush stroke 204.=

In the example image 200, the shape of the elements 210 is a line whose characteristics include a thickness and length (each of which can be specified as a number of pixels, for example). The shape characteristics for the elements 210 may further indicate that the line should be straight and/or should include some curvature. The colors of the elements 210 is a gradient that may vary from one end of the line to the other, and/or between adjacent elements 210. Varying the color along the shape of each element can give the element depth, while varying the color between elements can give the elements 210, as a group, texture. The locations of the elements 210 is based on the "root" of each hair, and in this example image 200, the roots are placed in a grid pattern within the brush stroke 204. In other examples, the roots could be placed in clusters, other patterns, or randomly within the area of brush stroke 204.

In the example of FIG. 2A, the user has started the brush stroke 204, and the image editor has responded by drawing strands of hair in the area that has so far been defined for the brush stroke 204. The strands of hair each have an initial shape, color, and location, which can be based on pseudo-random or constrained random values, as discussed further below. In the example of FIG. 2B, the user has completed the brush stroke 204 by unselecting (e.g., by releasing a mouse or trackpad button, or by breaking contact between a stylus or capacitive object and a trackpad, touchscreen, or digitizing tablet). The image editor has further drawn more strands of hair to fill in the total area of the brush stroke 204. Because each strand of hair has a length characteristic, while the roots of the strands of hair are within the brush stroke 204, the ends of the strands of hair extend outside the brush stroke 204.

In some examples, as soon as the user starts drawing the brush stroke 204, the image editor can begin animating the elements 210. For example, in FIG. 2B, the strands of hair near the top of the brush stroke 204 have been redrawn a few times to give the impression of a left-to-right motion. The strands near the bottom of the brush stroke 204 may have only been drawn once, or may also have been redrawn a few times. In some examples, the animation 202 begins when the user completes the brush stroke 204. In some examples, the animation 202 begins when the user enables the animation 202, for example by selecting a button on a control panel, selecting an item on a menu, or using another control provided by the user interface of the image editor.

To produce the animation 202, in various examples, the image editor can include an animation engine or can invoke an animation engine The animation engine can determine, for example, the rate at which the animation 202 occurs, which can also be referred to as the frame rate. For each frame in the animation cycle, the animation engine can determine a new set of values for each of the elements 210 produced by the brush stroke 204, and can redraw the elements 210. For example, the animation engine can determine an updated placement of the pixels of each element and/or modifications to the colors of each element, where the placement and colors can be determined and/or constrained by the parameters associated with the brush.

The animation engine can, for example, use a clock (e.g., a clock maintained by an operating system of the computing device on which the image editing program is running, and/or a clock provided by the computing device) to determine when the next animation frame should occur. The animation 202 can be configured to change at 30 frames per second, 60 frames per second, or another number of frames per second, for example, where the animation speed can be set by the user.

For each frame of the animation 202, the animation engine can determine where the pixels for each elements 210 should be drawn. In the case of the hair animation 202, the root of each strand of hair remains stationary, while pixels along the length of the strand change locations at different rates (e.g., pixels closer to the root move less while pixels farther from the root move more). Additionally, each strand of hair cannot be redrawn in an entirely new location, but rather should be redrawn relative to the last location where the strand was drawn. Moreover, adjacent strands of hair tend to move together.

Because of these and other considerations, the locations of the pixels of the elements 210 can be determined using random numbers that are constrained in some fashion. For example, the animation engine can use perlin noise to determine location values. Perlin noise is a technique used in digital graphics for producing textures and movement that reflect the controlled random appearance of movement and textures in nature. In a two-dimensional implementation, a perlin noise algorithm can constrain the new location for a pixel using the pixel's previous location, possibly with additional functions applied to smooth the transition.

Alternatively or in addition to perlin noise, the animation engine can apply constraints such as ranges and thresholds when determining pixel locations. A range, for example, can specify how far a pixel can move from a previous location. A threshold can specify, for example, can specify a minimum amount and/or a maximum amount a pixel can move, where the minimum and maximum amounts may be based on the locations of other pixels. The ranges and thresholds may be controlled, for example, by parameters for the animation. In the case of the hair animation 202, these parameters can include wind direction and velocity, among other examples.

In some examples, though perlin noise can be used to determine new pixel locations, the locations of the pixels may not need to be based on the pixels' prior location and/or the locations of other pixels. The rain drops in a rain animation, for example, need not move relative to one another, and may only need to move relative to each drop's prior position. In some examples, the locations of pixels of the elements 210 might not change, and instead only the colors change.

The animation engine can use similar techniques to change the colors of the elements 210 as are used to determine new locations for the pixels of the elements 210. For example, the animation engine can use perlin noise and/or various constraints to select color values for the individual pixels that make up the elements 210. In the example of the hair animation 202, the strands of hair have a base color, and the animation engine applies a gradient to each strand of hair, where the gradient varies from the base color. Applying the gradient can aid in giving the appearance of depth and texture. Additionally, the animation engine can change the gradient as the strands of hair are drawn in new locations. For example, as a group of strands swing to the right, darker shades can be applied, and as the group of strands swing to the left, lighter shades can be applied. Changing the colors in this fashion can imitate the manner in which lighting changes the color or appearance of hair as hair moves. Changing the colors can also improve the appearance of movement, as pixels of one color pass over pixels of a different color. In other examples, the brush elements may not need color gradients, and/or an animation may require that the elements not change color as the elements are redrawn.

In the example of the hair animation 202, additional effects can used to give a more dynamic appearance to the animation. For example, when the strands of hair are redrawn, the strands of hair are not removed from their prior location. That is, a new strand of hair is drawn while the old strand of hair is left in place. Instead of deleting the strands of hair from the prior locations, the animation engine "fades" the pixels (e.g., changes the colors to lighter value colors) of the older strands of hair. Doing so produces a shadow effect, and can enhance the appearance of movement. In various examples, this effect can be turned off, and/or may be unavailable for some animation brushes.

FIGS. 1C, 1D, 1E, 1F, 1G, and 2H show the image 200 with successive frames for the animation 202. In some cases, intervening frames between the frames that are illustrated may have been omitted. As illustrated by these example animation frames, sections of the hair swing together from left to right, with different sections sometimes swinging in different directions and the colors of the strands changing as the hair moves.

In some examples, the animation 202 may be cyclical, in that, the animation engine has generated a series of frames, the animation engine can repeat the series of frames. In these examples, the animation engine may generate five, ten, or some other number of seconds of frames, and can then replay these frames, rather than generating additional frames. In some examples, the animation engine continuously generates new frames whenever the animation is enabled.

In some examples, the brush stroke 204 for the animation 202 is associated with a particular layer of the image 200. For example, the image editing program can have "animation layers" or layers for which the animation engine can be enabled. In some examples, all the brush strokes drawn with the same animation brush in one animation layer may be animated together, meaning that the brush strokes are all controlled by the same set of parameters. In these examples, animations drawn with different types of animation brushes (e.g., hair versus rain) may need to be drawn in different animation layers. In some examples, the animated brush strokes in the same layer can be animated independent of one another. For example, each brush stroke or group of unconnected brush strokes may be controlled by an independent set of parameters. In this example, it may be possible to draw animations drawn with different animation brushes in the same layer.

The image editing program may be able to store animation information in a proprietary format, so that the animations can be edited or changed later. In various examples, the image editing program can also output an image that includes animations in one of various standardized formats, so that the image can be transmitted and/or shared. For example, the image editing program may be able to output the image 200 as a Graphics Interchange Format (GIF) file, an Audio Video Interleave (AVI) file, a Flash Video Format (FLV) file, a Windows Media Video (WMV) file, an Apple Quicktime Movie (MOV) file, or a Motion Pictures Expert Group 4 (MP4) file, among other examples.

In some examples, audio can be associated with the animations drawn by an animated brush. For example, the hair animation 202 or grass animation can include the sound of wind, a rain animation can include the sound of water hitting different surfaces, and a night sky animation can include the sound of crickets chirping, among other examples. In these and other examples, the audio can also be controlled by the parameters that control the animation. For example, the sound of wind can be at the same intensity as the wind parameter value that determines the degree to which the hair of the hair animation 202 moves. In these and other examples, the audio can also be included in an output file when the output file format supports audio (e.g., the WMV, MOV, and MP4 file formats, and others).

In some examples, an animation drawn with an animation brush can be associated with a live data feed. In these examples, the animation engine can use the data feed to determine some of the parameters of the animation. For example, in the case of the hair animation 202, the animation engine can be provided with a connection to a weather data feed, and can use the wind conditions of a certain location to determine the wind direction and intensity to use when animating the hair. As another example, a rain animation can also use local weather conditions to determine the amount of rain to include in the animation. In these and other examples, the source of the data feed can be specified, for example, by entering a network address such as a Uniform Resource Locator (URL) into a field provided in an animation control panel.

Figure 3:
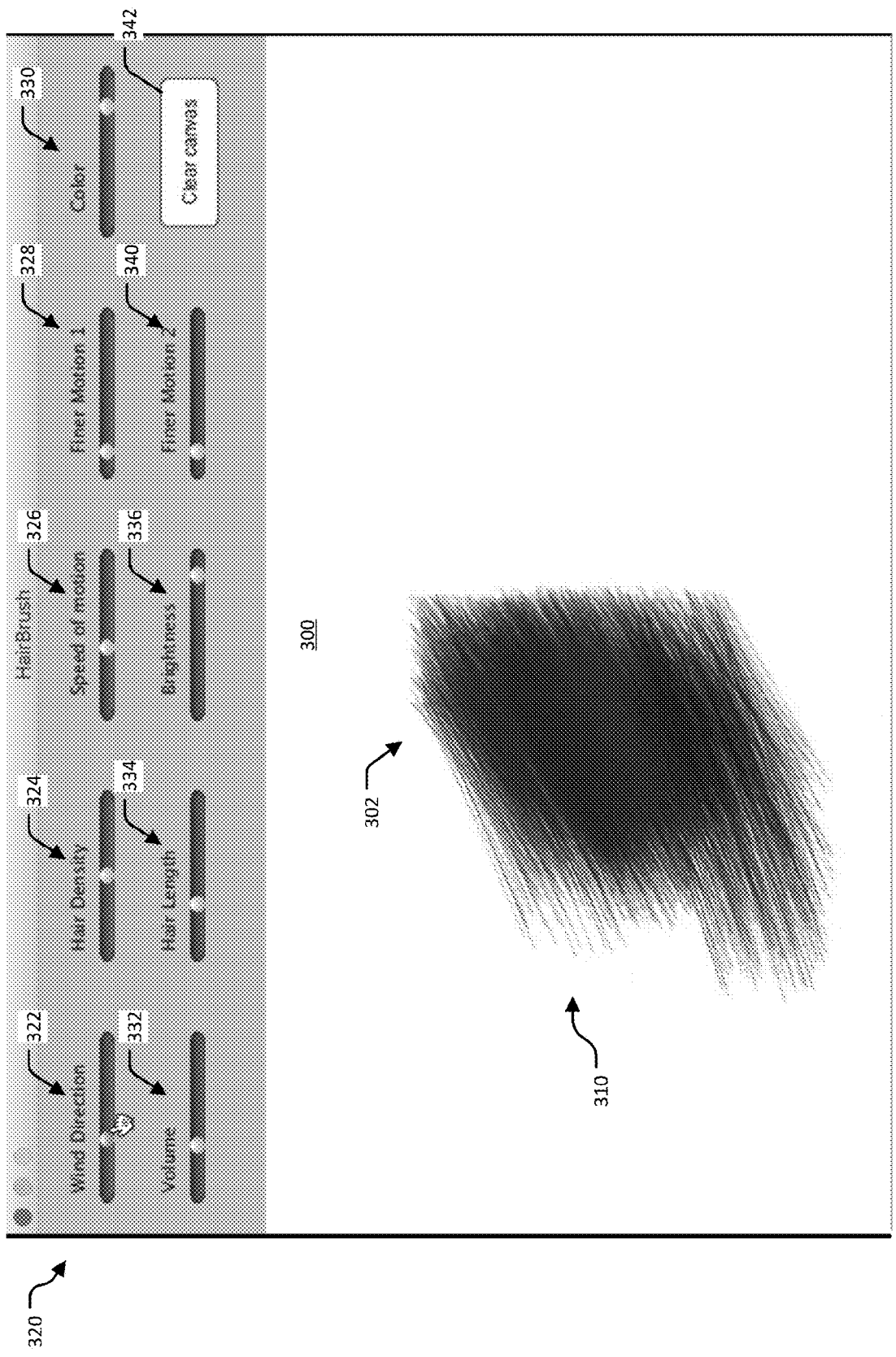
FIG. 3 includes an example illustration of a control panel for controlling the parameters of an animation drawn in an image.

FIG. 3 includes an example illustration of a control panel 320 for controlling the parameters of an animation 302 drawn in an image 300. In the example illustrated in FIG. 3, the animation 302 was produced using the hair brush discussed with respect to FIGS. 2A-2H. The control panel 320 of FIG. 3 provides control over various parameters of the hair animation 302. Other animation brushes can have similar control panels, which can control similar or different parameters.

The control panel 320 of FIG. 3 can be displayed in the user interface of an image editing program, for example when the hair brush is enabled and/or when a brush tool is enabled. Alternatively or additionally, the control panel 320 can be a displayed in a window that can be opened, closed, and/or moved around within the user interface. In some examples, the control panel 320 is associated with the layer in which the animation is drawn. In these examples, the control panel 320 may only be available when the layer is active. Alternatively or additionally, the control panel 320 may be activated from an options menu associated with the layer.

Alternatively or additionally, in some examples, the control panel 320 can be displayed by enabling a window for the control panel from an onscreen menu.

The example control panel 320 provides control over various parameters that determine the appearance and/or motion of an animation 302. In the example of FIG. 3, parameters that can be controlled from the control panel 320 include a wind direction 322, a volume 332, a hair density 324, a hair length 334, a speed of motion 326, a brightness 336, finer motion 1 228, finer motion 2 240, and color 330. The wind direction 322 parameter specifies a direction from which a hypothetical wind is coming, where the direction of the wind changes the direction in which the hair elements 310 move. The volume 332 parameters specifies a thickness (e.g., in pixels) of each strand of hair. The hair density 324 parameter specifies the number of hair elements 310 present in the brush stroke area. The hair length 334 parameter specifies a length of each strand of hair. In some examples, a random variation can be included, so that the length of the individual strands may vary within a range (e.g., 1 to 5 pixels or another number of pixels) from the specified length. The speed of motion 326 parameter can control how quickly the animation 302 moves. For example, the speed of motion 326 parameter can change the rate at which the animation 302 is redrawn (e.g., at 60 frames per second, at 30 frames per second, or at another number of frames per second). The brightness 336 parameter controls a brightness or lightness value for the colors of the elements 310, with black being one extreme and white being the opposite extreme. The finer motion 1 228 and finer motion 2 240 parameters can be used to vary the motions of the strands of hair, for example to increase or decrease the degree to which the strands move together. The color 330 parameter controls the base color of the hair elements 310, enabling the user the change the base color from, for example, blue to green to red, and shades in between. These are a few examples of parameters that can be used to control the animation 302, with other parameters being possible. Additionally, for other animation brushes, some of the parameters may have similar functionality but different names.

In the example of FIG. 3, each of the parameters can be modified using a "slider;" that is, a graphical element that enables the user to pick a value for a parameter by moving an indicator to the right or left. In this example, the location of the indicator can indicate a value, such as a value between 0 and 100 or between 1 and 256, among other examples. In other examples, the control panel 320 can include a text field that can enable the user to input a value, a circular selector that can enable the user to specify a value by selecting a radian, or another type of graphical element for setting a value.

The control panel 320 further includes a button 342 that, when selected, can remove the animation 302 from the image 300. Alternatively, in some examples, the button 342 can return each of the controls to a default setting.

In various examples, one or more of the parameters illustrated in the example control panel 320 can be associated with or linked to a real-time, live data feed. In these examples, the image editing program can obtain values for the parameters from the data feed, and can set the sliders in the control panel 320 accordingly. For example, the parameters in the control panel 320 can be linked to a data feed for the weather in a particular city or locality. In this example, parameters such as the wind direction 322 and/or the speed of motion 326 can be set to reflect the wind direction and/or wind speed in the particular city or location. In various examples, the data feed can be obtained from a network location, from sensors or input devices of the computing device on which the image editing program is running, and/or from another computing device that is in communication with the computing device on which the image editing program is running. To specify the source of the data feed, the control panel 320 can include, for example, a text entry field (not shown here), and/or a button that activates a menu or window in which the user can enter a network address or other identifier for the data feed. In various examples, the data feed can provide an Application Programming Interface (API), which the image editing program can use to obtain data from the data feed.

Various other animated brushes can have similar controllable parameters as does the hair brush, and can be animated along similar principles. For example, a grass brush can enable a user to draw blades of grass that move back and forth as if in a wind. Similar to a hair animation, the blades of grass have a length and a root that remains stationary, and the pixels making up a blade of grass move a greater amount the further the pixels are located from the root.

Additionally, groups of blades of grass can be animated as moving together, and can be drawn with gradients to enhance the texture, depth, and appearance of movement.

Example steps that an animation engine can perform when drawing animated hair or grass (or something similar) will now be discussed.

A first example step is to initialize an array for storing coordinates within the area of the brush stroke. This array will be referred to as "brushCover" in this discussion.

The second step is to initialize a variable, which will be referred to as "cols," for column locations, and a variable, which will be referred to as "rows," for row locations. The cols and rows variables can be floating point values. The rows variable can further be an array. The cols and rows variables can be initialized relative to the width and height of the image, using a scale value. The scale value can be used to accommodate resolution of image. For example, cols can be set equal to width/scale and rows can be set equal to height/scale.

The third step is to initialize a variable to store the radius of the brush. This variable can be an integer, and will be referred to as "brushRad" in this discussed.

The fourth step is to initialize a vector, referred to as v, which will be rendered in different directions at different times.

The fifth step is to initialize a offsets for each cardinal direction, x, y, and, z, to a value of zero. These offsets will be referred to as "xoff," "yoff," and "zoff" in this discussion.

The sixth step is to all points in the image that are within the area of the brush stroke. This step can be executed upon detecting a selection in the image by way of clicking of a mouse or trackpad button or contact with a touchscreen or digitizing tablet with a stylus or capacitive object (e.g., a finger). The scale variable can be applied to accommodate the resolution of to image. Each coordinate that is within a distance of the brushRad is added to the brushCover array. An example code segment for finding the pixel locations in the area of the brush stroke is as follows:

```
for (int y = 0; y < rows; y ++) {
    for (int x = 0, x < cols; x++) {
        if (distance (mouseX, mouseY, x*scale, y*scale) < brushRad) {
            brushCover.add(x*scale);
            brushCover.add(y*scale);
        }
    }
}
```

The seventh step is to iterate over values of x from zero to brushCover.length, and to determine scaled coordinates. The scaled coordinates are stored as x and y values.

The eight step is to use perlin noise to generate a variable "r" from (xoff, yoff, zoff) scaled to pi, as follows:

r=noise(xoff, yoff, zoff)*PI;

The ninth step is to use perlin noise to generate a variable "c" from (xoff, yoff, zoff) scaled to 255, as follows:

k=noise(xoff, yoff, zoff)*255;

The tenth step is to use a transformation matrix. The transformation can translate each (x, y) pair and rotate to the angle of rotation of the vector v.

The eleventh step is to draw a line of length "hairLength" from 0,0 to hairLength,0. The stroke weight of the line can be determined from a "hairThickness" variable. the color of the line color could be generated using a combination of the variable k.

The twelfth step is to close the transformation matrix and increment xoff, yoff, and zoff by a value "inc," which determines speed of movement.

In the preceding example steps, variables such as hairLength, scale(density), inc(speed), hairThickness, and/or color, among other examples, could be used as controls. In some examples, drawing of the hair elements can be delayed until after the brush stroke is drawn.

As an example, by varying the angle from pi to −pi and using green as the color (and possibly also modifying other parameters) grass can be drawn and animated.

Figure 4:
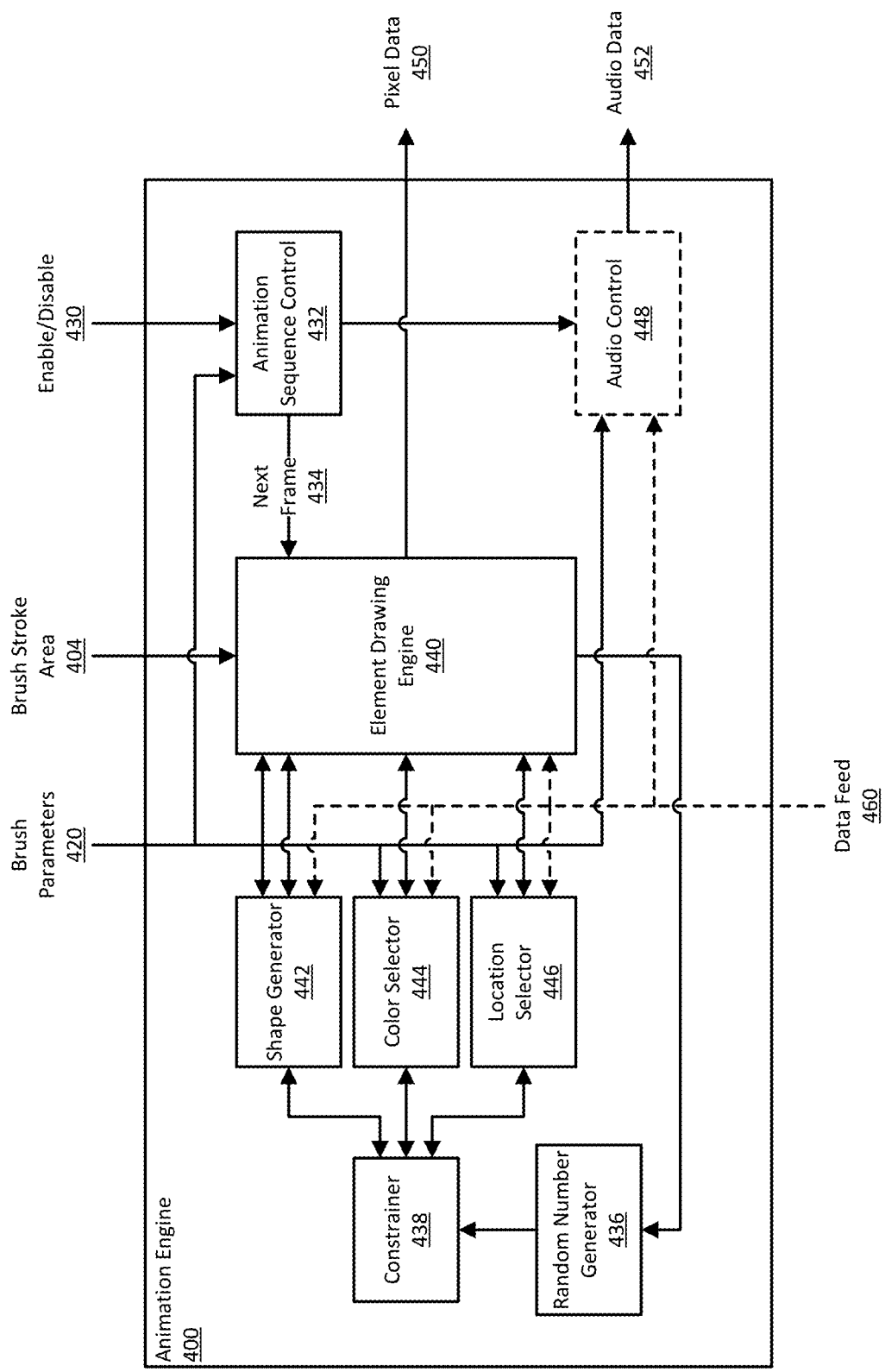
FIG. 4 includes a block diagram illustrating an example of an animation engine.

FIG. 4 includes a block diagram illustrating an example of an animation engine 400. The example animation engine 400 can be included in an image editing program, and/or can be invoked by an image editing program as a separate process. The components of the animation engine 400 can be implemented, for example, using program code. The program code can include instructions that, when executed by a processor of a computing device, can cause the processor to execute the functions of the different components of the animation engine 400.

In various examples, the animation engine 400 can output pixel data 450 that provides the initial shape, color, and/or location of the elements of an animation. The output pixel data 450 can be used by the image editor to drawn the elements as the user makes a brush stroke and/or once the user completes the brush stroke. The initial elements can be drawn in the image so that the user can see what the elements look like, and so that the user can modify any parameters of the elements. When the animation is enabled, the animation engine 400 can also output updated pixel data 450, which the image editing program can use to redraw the elements. The redrawing of the elements can give the elements the appearance of motion.

The animation engine 400 receives as inputs brush parameters 420 and a brush stroke area 404. The brush parameters 420 are associated with the animation brush that was used to draw the brush stroke area 404. For example, when the animation brush is the hair brush, the brush parameters 420 can include parameters such as hair length, hair density, wind direction, and/or a base color, among other examples. The brush parameters 420 can be input, for example, as a set of key-value pairs. The animation engine 400 inputs the brush parameters 420 into each of a shape generator 442, color selector 444, location selector 446, and an element drawing engine 440.

The brush stroke area 404 is the area of an image that over which the user has drawn with the animation brush. The brush stroke area 404 can be provided, for example, as pixel coordinates, ranges of pixel coordinates, areas of pixel coordinates, and/or a combination of pixel coordinates of different types. In some examples, the brush stroke area 404 can be a continuously updating input, such as when the animation engine 400 is able to draw animation elements while the user is in the process of drawing a brush stroke. In some examples, the brush stroke area 404 is a static input, such as when the animation engine 400 is animating a brush stroke that was drawn previously.

In the example of FIG. 4, the animation engine 400 inputs the brush stroke area 404 into the element drawing engine 440. In various examples, the element drawing engine 440 determines the shape, color, and/or location of each element of an animation, and outputs the pixel data 450 that can be used to draw the elements. The element drawing engine 440 can be triggered upon receiving the brush stroke area 404, which may be provided when or as the user draws a brush stroke. The element drawing engine 440 can then request shape data from the shape generator 442, color data from the color selector 444, and/or location data from the location selector 446.

In various examples, the shape generator 442 can use the brush parameters 420 to determine the shape of each of the elements that are to be drawn. For example, the brush parameters 420 can include shape characteristics describing hair (e.g., a length, a thickness, a degree of curvature or curl, etc.). As another example, the brush parameters 420 can include shape characteristics describing bubbles (e.g., a diameter or range of diameters). As another example, the brush parameters 420 can include characteristics describing stars in a night sky (e.g., a size or range of sizes). Using this information, the shape generator 442 can output a description for each element to be drawn.

In some examples, such as in the case of hair, smoke, and others, each element of the animation may not be identical. In these examples, the element drawing engine 440 can request random values from a random number generator 436, which can be used by the shape generator 442 to vary the shapes of individual elements. Values output by the random number generator 436 can be input into a constrainer 438, which can be configured by the shape generator 442 to constrain the random values to ranges that are suitable for the shapes being determined by the shape generator 442. For example, for hair elements, the shape generator 442 can program the constrainer 438 with a range of possible lengths, range of thicknesses, degree of curl, and so on. In various examples, the constrainer 438 can implement a perlin noise technique to constrain the values determined by the random number generator 436. In some examples, the shapes of the elements may each be the same, in which case the shape generator 442 may not need randomized values.

The color selector 444 can similarly use the brush parameters 420 to determine colors for the element drawing engine 440 to apply to the elements. The brush parameters 420 can supply a base color and/or range of colors for the elements, and the color selector 444 can use this information to output color values for each element. The color values can be, for example, a gradient, a set of colors, and/or a single color value. To select the colors, the element drawing engine 440 can request random values from the random number generator 436, and the color selector 444 can configure the constrainer 438 with the ranges of colors indicated by the brush parameters 420.

The location selector 446 can also the use the brush parameters 420 in determine the placement of the elements within the image. The brush parameters 420 can include, for example, a wind direction, a wind speed, and/or finer motion controls, in the case of a hair animation, and for other animations can include other parameters related to the motion of the elements, such as a direction, a velocity, effects of other elements, environmental effects, and so on. In various examples, shape characteristics can also affect pixel locations determined by the location selector 446. For example, the pixels for a strand of hair should not move as one to a new location, but instead should move to different degrees with respect to the root of the hair.

To determine new pixel locations, in various examples, the element drawing engine 440 can request random values from the random number generator 436. The location selector 446 can configure the constrainer 438 to limit the random values according to the motion parameters of the brush. In some examples, the constrainer 438 can apply perlin noise to determine the degree and direction of movement of the pixels of an animation. In some examples, the amount and direction of the movement can also be constrained by the locations of neighboring elements, such as when elements move together or elements interact with one another.

In some examples, elements of an animation may not move at all. For example, stars in the night sky may be animated in place. In these examples, the location selector 446 can output stationary locations for the elements, and may not need random values from the random number generator 436.

In various examples, the values output by the shape generator 442, the color selector 444, and the location selector 446 can be inter-related. For example, the color to be applied to a specific element may be affected by the element's particular shape and location within the animation. As another example, an element's shape might be affect by the element's location or interaction with other elements in the animation. In these and other examples, the constrainer 438 can be simultaneously be configured by one or more of the shape generator 442, the color selector 444, and/or the location selector 446 when determining either shape values, color values, and/or location values.

In various examples, the element drawing engine 440 uses the values output by the shape generator 442, the color selector 444, and/or the location selector 446 to determine locations and colors for each of the pixels of each element of the animation. The element drawing engine 440 can output this information in the pixel data 450. The image editing program can then use the output updated pixel data 450 to render the pixels in the image.

The operations of the element drawing engine 440, the shape generator 442, the color selector 444, and the location selector 446 have been so far described as occurring when the animation engine 400 receives brush stroke area 404, such as may occur when the user is generating a brush stroke and/or has completed a brush stroke. The operations can also be triggered by an animation sequence control 432 of the animation engine 400.

In various examples, the animation sequence control 432 can control redrawing of the elements of the animation, so that, in redrawing the elements, the elements are given the appearance of movement. The animation sequence control 432 may be enabled by default, and/or can be controlled by a enable/disable 430 input that can be set by the image editing program and/or a user. When enabled, the animation sequence control 432 can determine when a next frame 434 of the animation should occur. The animation sequence control 432 can use the brush parameters 420 to determine the time of the next frame 434, for example using a parameter indicating a rate of movement or a frame rate.

When the animation sequence control 432 determines the time of the next frame 434, the animation sequence control 432 can trigger the element drawing engine 440 to generate updated pixel data 450 for each of the elements of the animation. Upon being triggered, the element drawing engine 440 can request shape values, color values, and/or location values from the shape generator 442, the color selector 444, and the location selector 446, respectively. In some examples, shape generator 442, color selector 444, and/or location selector 446 can store previous values for the shapes, colors, and locations, and can determine updated values based the stored values. For example, the updated values may be constrained by the stored values. Retaining previous values can smooth the transitions between changes in successive frames.

In some examples, an animation brush can be associated with a sound. For example, an animation drawn with a rain brush can be accompanied by the sound of rain drops. As another example, a night sky animation can be accompanied by the sound of crickets. As another example, a bubble animation can be accompanied by the sound of bubbles popping. In these and other examples, the animation sequence control 432 can enable an audio control 448, which can output audio data 452. The audio data 452 can be played through the speakers of a computing device that is executing the image editing program, and/or can be encoded into an output file that includes the image and the image's animations. In some examples, the audio data 452 can be incorporated into the animation engine 400. In some examples, the audio control 448 obtains the audio data 452 from files stored externally from the image editing program, such as on a local hard drive or at a network location.

In various examples, the audio control 448 can modify the audio data 452 based on the brush parameters 420. For example, for a rain animation, when the brush parameters 420 indicate a small amount of rain, the audio control 448 can adjust the audio data 452 to match the amount of rain being illustrated. Also in this example, when the brush parameters 420 indicate a large amount of rain, the audio control 448 can adjust the audio data 452 to increase the number of raindrop sounds. In some examples, the audio data 452 is enabled whenever the animation is enabled. In some examples, the audio data 452 can be enabled independently of the animation.

In some examples, an animation being generated by the animation engine 400 can also be affected by a data feed 460. The data feed 460 can be a continuously updating stream of data, and/or a periodically (e.g., every few minutes, hours, or days, among other examples) updating stream of data. The data feed 460 may be generated by the computing device on which the image editing program is running, for example by an application executing on the computing device, by a sensor or actuator of the computing device, and/or by an input device, among other examples. Alternatively or additionally, the data feed 460 can be coming from a network location.

Using the data feed 460, the animation engine 400 can generate an animation that reflects real-world conditions. For example, the animation engine 400 can generate the animation according to a wind speed and direction in the current location of the computing device, or in another location. As another example, the animation engine 400 can generate the animation to reflect current weather conditions. As another example, the animation engine 400 can generate the animation to reflect crowd size, traffic conditions, noise levels, time of day, time of year, a user's gestures or motions, and many other real-time factors. In various examples, the data feed 460 can affect the element shapes determined by the shape generator 442, the colors determined by the color selector 444, the pixel locations determined by the location selector 446, and/or the nature of the audio data 452 being output. In this way, the real-time data in the data feed 460 can be reflected in the animation being output by the animation engine 400.

Figure 5:
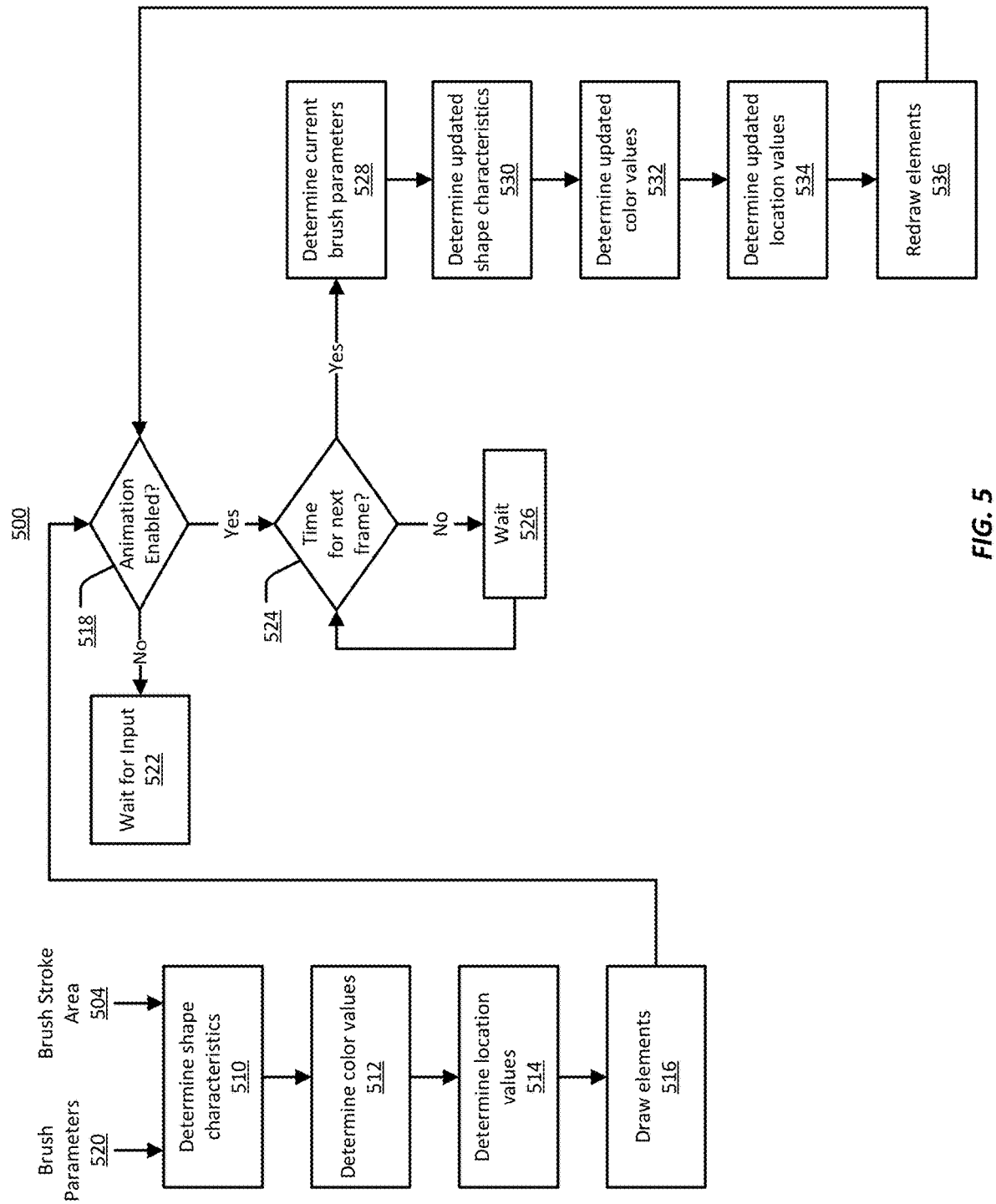
FIG. 5 includes a flowchart illustrating an example of a process that can be performed by the animation engine illustrated in FIG. 4.

FIG. 5 includes a flowchart illustrating an example of a process 500 that can be performed by the animation engine illustrated in FIG. 4. The steps of the example process 500 of FIG. 5 can be implemented, for example, using program instructions that can be executed by an integrated circuit device implementing a processor. When executed by the processor, the instructions can cause the processor to perform the steps of the illustrated process 500. The process 500 can be invoked, for example, when a user uses an animation brush to draw a brush stroke in an image that is open in an image editor program.

The process 500 can receive as input brush parameters 520 associated with a particular animation and a brush stroke area 504 for the animation. The brush parameters 520 can be, for example, key-value pairs, keys and ranges of values, and/or keys and starting and ending values, among other examples. The keys, which may also be referred to as fields or properties, can be determined by animation brush that was used to draw the animation. The values can be default values, can be values set by a user, and/or can be values derived from a data feed. The brush stroke area 504 describes an area of the image that was painted over using an animation brush. The brush stroke area 504 can include pixel locations within and/or around which the animation is to be generated.

At step 510, the process 500 includes determining shape characteristics for the elements. The shape characteristics can determined by the animation brush that was used to draw the animation (e.g., hair for a hair brush, grass for a grass brush, bubbles for a bubble brush, etc.) In some examples, the shape characteristics can describe the general shape of the elements (e.g., for hair, a line having a length and thickness) and a range of possible variations in the shape (e.g., for hair, ranges of lengths, degrees of curvature or curl, etc.).

At step 512, the process 500 includes determining color values for the elements. The color values can be determined from the brush parameters 520, which may indicate a set of colors to use, and/or a base color from which, at step 512, the process 500 determines variations. The variations can include, for example, different shades or tones from the base color, and/or gradients based on the base color.

At step 514, the process 500 includes determining location values for the elements of the animation. At this step, the location values are initial locations, for the first instance when the elements are drawn. The locations can be determined from the animation brush used to drawn the animation. For example, the animation brush may dictate that the elements be placed in a grid within the brush stroke area 504, randomly within the brush stroke area 504, in clusters within the brush stroke area 504, at a certain density or spacing within the brush stroke area 504, or in another arrangement with respect to the brush stroke area 504. Alternatively or additionally, the locations can be determined from the brush parameters 520, which may indicate information such as density, spacing, and/or placement.

At step 516, the process 500 includes drawing the elements. At this step, the elements are drawn for the first time. Drawing the elements places static pixel of a certain color in the image at specific locations. Drawing the elements can include applying the color values from step 512 to shapes determined at step 510, and drawing the shapes according to the locations determined at step 514. The elements, once drawn, are stationary; the animation effect is produced by redrawing of the elements, as described in the steps that follow.

At step 518, the process 500 determines whether the animation is enabled. When the animation is not enabled, the elements are not redrawn and no changes occur in the image. The process 500 proceeds to step 522, and waits for input, such as input enabling the animation.

When, at step 518, the animation is enabled, the process 500 proceeds to step 524, and determines whether a current time is the time for the next frame of the animation. The process 500 can use, for example, a system clock to make this determination. For the current time to be the time for the next frame, the process 500 can, for example, store a timestamp for the last frame of the animation (which, when the step 524 is first reached, can be the time when the elements are drawn at step 516), and can then compare a difference between the current time and the stored timestamp against a frame rate. When the current time is not the time for the next frame, the process 500 can proceed to step 526, and wait until the appropriate time. Once the appropriate time is reached, or the process 500 has waited a certain interval of time, the process 500 returns to step 524.

When, at step 524, the process 500 determines that the current time is the time for the next frame of the animation, the process proceeds to step 528, and determines the current brush parameters 520. The brush parameters 520 may have changed, for example, because the user change the parameters and/or because the brush parameters 520 are associated with a data feed.

The process 500 next proceeds to step 530, and determines updated shape characteristics. While the basic shape of the elements may be determined by the animation brush, some shape characteristics may be modifiable through the brush parameters 520. For example, the brush parameters 520 may enable modification of the size and/or dimensions of the basic shape.

At step 532, the process 500 next determines updated color values. The updated color values can be based on the current brush parameters 520, which can include a different set of colors to use and/or a different base color to use. The updated color values can further be based on the previous color values. For example, the process 500 can determine to change the colors of an individual element to enhance the appearance of movement. In various examples, the updated color values are determined using constrained random numbers, where the random numbers can be constrained using a perlin noise technique, for example.

At step 534, the process 500 determines updated location values. The updated location values can place the individual pixels of each element at a slightly different location than when the element was last drawn, so that the element appears to have moved. The updated location values can be determined from the animation brush used to draw the animation, which can define the basic motion of each element. The updated location values can further be determined using the brush parameters 520, which can include parameters that affect the direction and speed of the motion, among other factors. The updated location values can further be determined from the previous location values. To give the appearance of motion, and element should not be drawn randomly in a new location, but should instead be drawn near the element's previous location.

At step 536, the process 500 includes redrawing the elements. Redrawing the elements can include placing pixels for the elements in the image according to the updated location values and shape characteristics, and giving the pixels the updated color values. In some examples, at this step, the previously drawn elements are removed from the image. In some examples, the previously drawn elements are not removed, but may be modified in some way. For example, the colors of the previously drawn elements may be changed to a shade that is closer to a background color, so that the previously drawn elements appear to fade into the background. In some examples, previously drawn elements may gradually fade into the background over a number of animation frames. In some examples, the previously drawn elements are removed from the image after an interval of frames.

Once the elements have been redrawn at step 536, the process 500 returns to step 518, and again check whether the animation is enabled.

The process 500 illustrated in FIG. 5 determines new pixel values for each frame of the animation. In other examples, an animation engine can store a certain number of frame. In these examples, instead of generating new pixel values for each frame, the animation engine can repeat the stored frames. The animation, in these examples, will thus be cyclical.

FIGS. 6A-6D illustrate an example image 600 that includes an animation 602 drawn using an animation brush. In this example image 600, the animation brush was a squiggle brush, which produces elements 610 in the shape of dots that move in random directions and leave a trail as the dots move. The dots can have three, four, or another number of different colors, and/or can have colors that are within a range or gradient of a base color. In this example image 600, the elements 610 are circular in shape, and are each the same size. In other examples, the elements can have different shapes (e.g., squares, triangles, ducks, trees, or another shape), can have multiple shapes, and/or can have a range of sizes.

Parameters of the squiggle brush that can be controlled can include, for example, a size of the dots, the colors of the dots, the initial number of density of the dots within the area of the brush stroke, the speed at which the dots move, the rate at which the dots disperse, and other parameters. The parameters can be linked to, for example, a data feed tracking crowd movement.

Figure 6A:
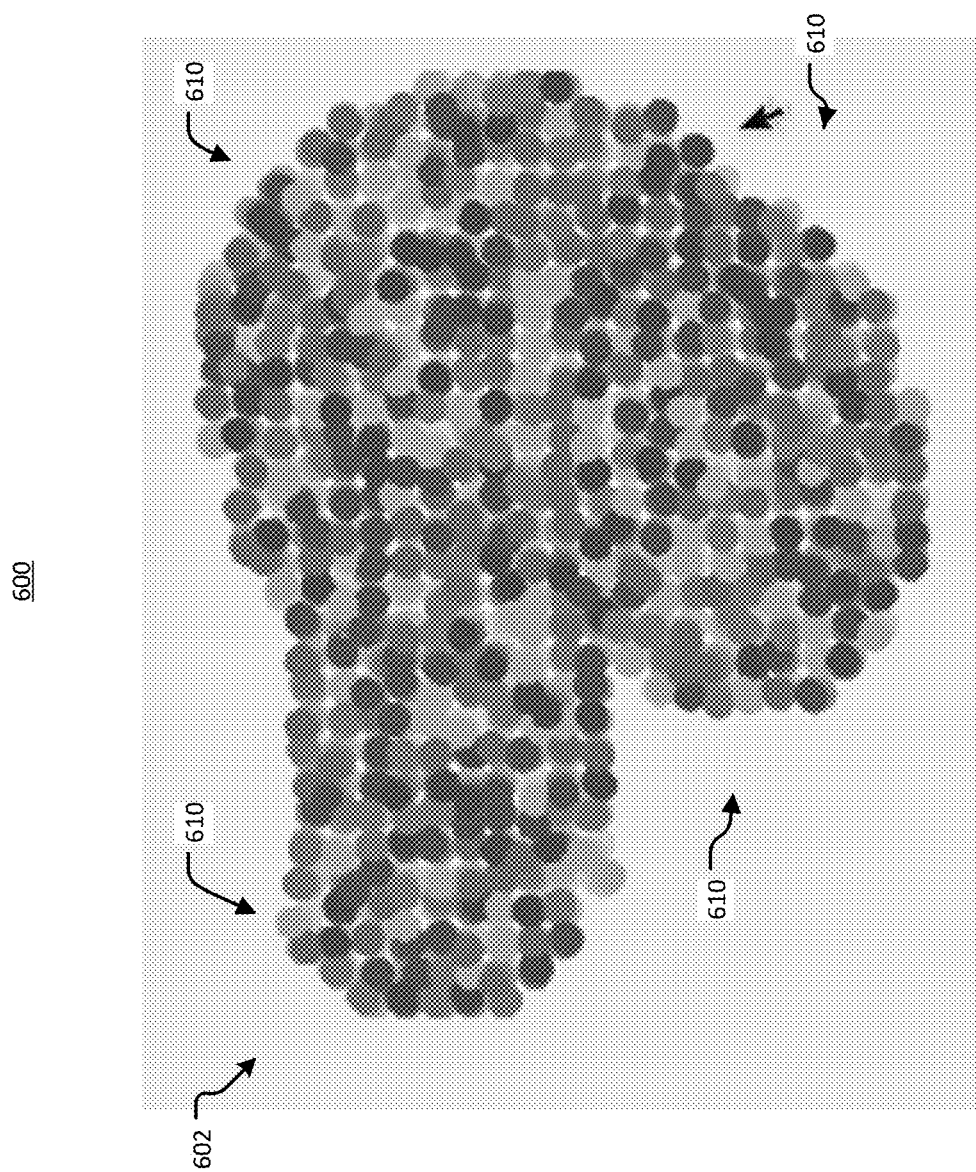
FIGS. 6A-6D illustrate an example image that includes an animation drawn using an animation brush.
Figure 6B:
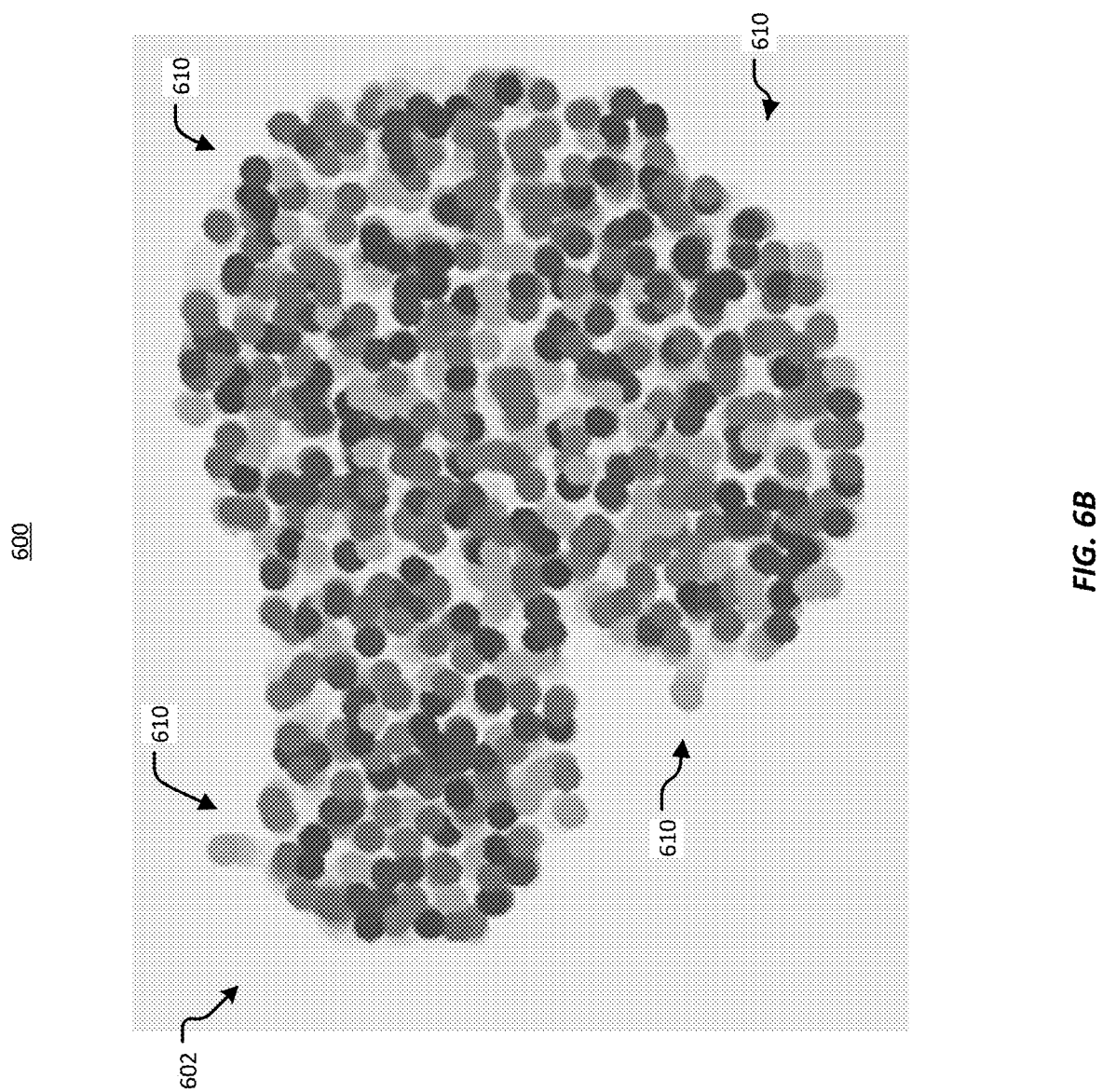
Figure 6C:
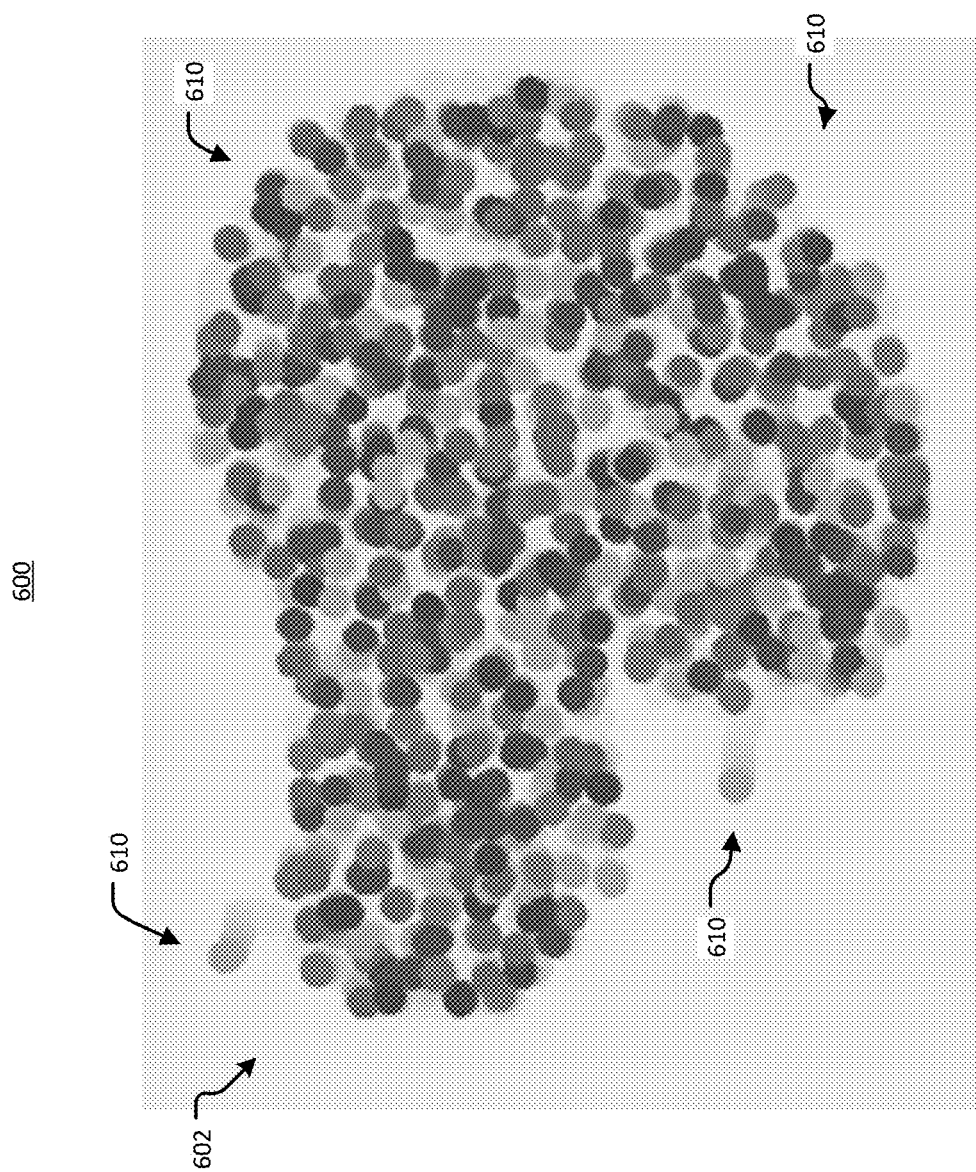
Figure 6D:
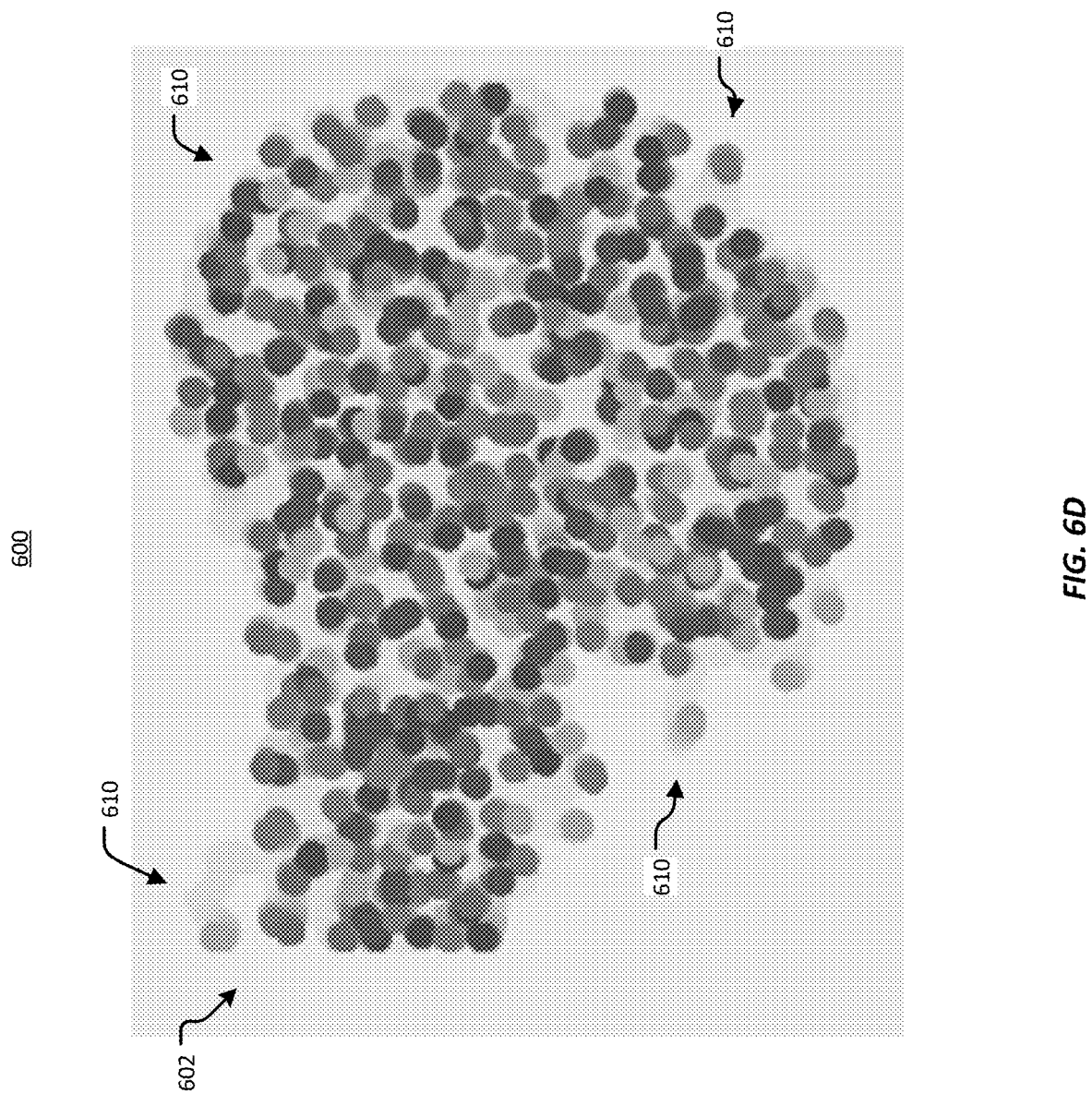

FIG. 6A illustrates the animation 602 approximately when the user has finished drawing the brush stroke. At this point in time, the animation engine has drawn the elements 610 within the area of the brush stroke. FIGS. 6B, 6C, and 6D illustrate successive frames of the animation 602, possibly with intervening frames omitted. As illustrated by FIGS. 6B, 6C, and 6D, as the animation 602 progresses, the elements 610 move in random directions, and may move beyond the boundary of the brush stroke. In some examples, the elements 610 may be interacting with one another. For example, the elements 610 may be configured to bump into one another, so that impact with a neighbor element may dictate the direction and/or velocity of each element.

In various examples, other animations, such as bubbles or cytoplasm, can be produced using similar principles (e.g., the individual elements can travel outside the area of the brush stroke and/or can interact with one another). In some examples, an animation can be produced that uses a similar procedure for determine the movement of the elements, but constrains the movement of the elements to the area of the brush stroke. A "skein" brush, for example, produces dots that leave a trail as they move, and that bounce off the edges of the brush stroke. In this example, the elements produce an animation that may look like a mass of yarn.

Example steps that an animation engine can perform when drawing animated bubbles (or something similar) will now be discussed.

A first example step is to initialize variables "transparency", "refreshtransparency", "scale", "movement", "number," and "bubbleRadius," for the transparency, rate of transparency change, movement, number of bubbles or balls, and size of the bubbles, respectively.

The second step is to initialize a palette array with colors from a color palette. The colors selected from the color pallet can be determined from parameters associated with the animation brush, for example.

In some examples, the third step is to draw a background for the image. For example, the background can be drawn as a uniform white, or another color. In some examples, the third step is to determine an existing background color.

The fourth step is to initialize an array "bal" to hold a class of objects named "Balls." The size of this array can be "number" (e.g., the number of bubbles).

When the user has drawn a brush stroke, the brush can fill the area of the brush stroke with a particular color, such as black or white. The fifth step then occurs, which is to clear the bal array.

The sixth step is to iterate through the pixels of image at every scale position for every pixel coordinate x and y. When the color at (x, y) is the brush stroke color (e.g., black), a new ball from the Ball class is added to the bal array.

In some examples, the movement of the bubbles or balls can be limited to the area of the brush stroke. In these examples, the boundary pixels can be marked and passed to the Ball class.

Once all the Ball objects have been added to the bal array, the seventh step is to run the update function of the Ball class for each element in the bal array.

The Ball class discussed above will now be described. When an object of the Ball class is constructed, the object can be initialized with x and y coordinates (indicating the object's initial location in the image), a maximum radius, movement boundaries, and movement speed, among other parameters. Location offsets xoff, yoff, and zoff can also be initialized to zero. These offsets are incremented each time an update function of the class is called. When the update function is called, the object can provide the xoff, yoff, and zoff variables and the movement variables to a perlin noise generator, which can provide new x and y locations. In some examples, the x and y locations can be constrained by the movement boundaries. Once the x and y are determined, the Ball object can draw an ellipse located at the x and y coordinates.

FIGS. 7A-7D illustrate another example image 700 that includes an animation 702 drawn using an animation brush. In this example image 700, the animation brush was a night sky brush, which produces elements 710 that resemble stars in a night sky. The stars can vary in size, such as between one and two pixels (or another number of pixels) in size. The elements 710, in this case, are stationary, meaning that, when an element is redrawn, the element is redrawn in the same location. The animation, in this case, includes varying the color and/or size of each element to give the effect of twinkling. For example, the color of an individual element can transition from white to grey to dark grey or black and then back to white. As another example, an element can grow and shrink from a maximum size to a minimum size, and then grow again to the maximum size. In some examples, the animation 720 can also random insert shooting stars.

Parameters of the night sky animation 702 can include, for example, a background color for the sky, a density of the stars, a range of colors within which the stars change, and a rate at which the stars change, among other examples. Audio for the night sky animation 702 can include night sounds, such as hooting owls, chirping crickets, croaking frogs, and so on. Alternatively or additionally, the night sky animation 702 can be linked to a data feed for a particular location (e.g., a city block, a park, or a town), and the audio can be obtained from the location. In some examples, the night sky animation 702 can reflect the night sky in a particular location, such as at a particular longitude and latitude.

Figure 7A:
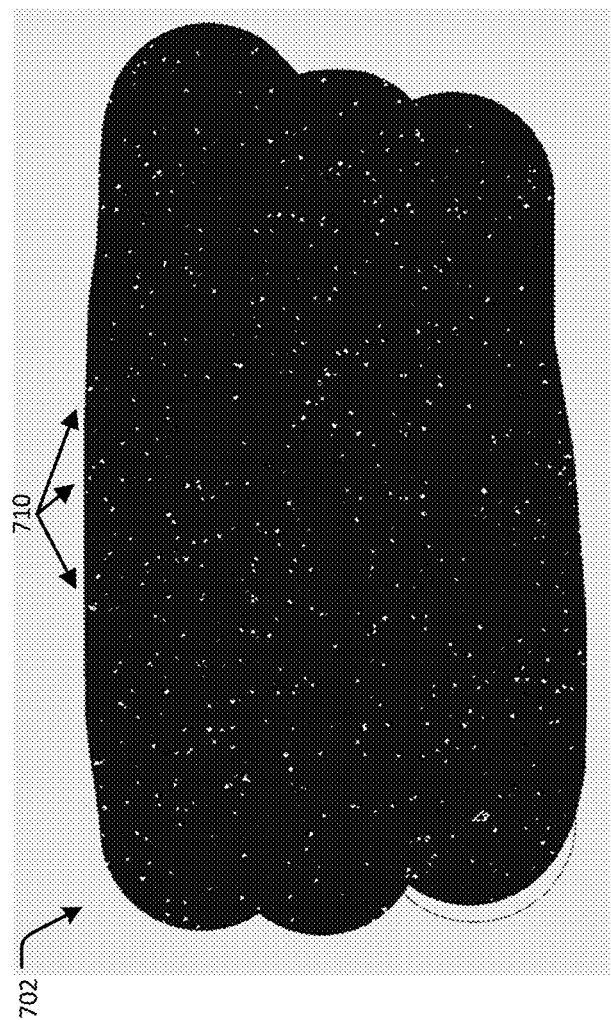
FIGS. 7A-7D illustrate another example image that includes an animation drawn using an animation brush.
Figure 7B:
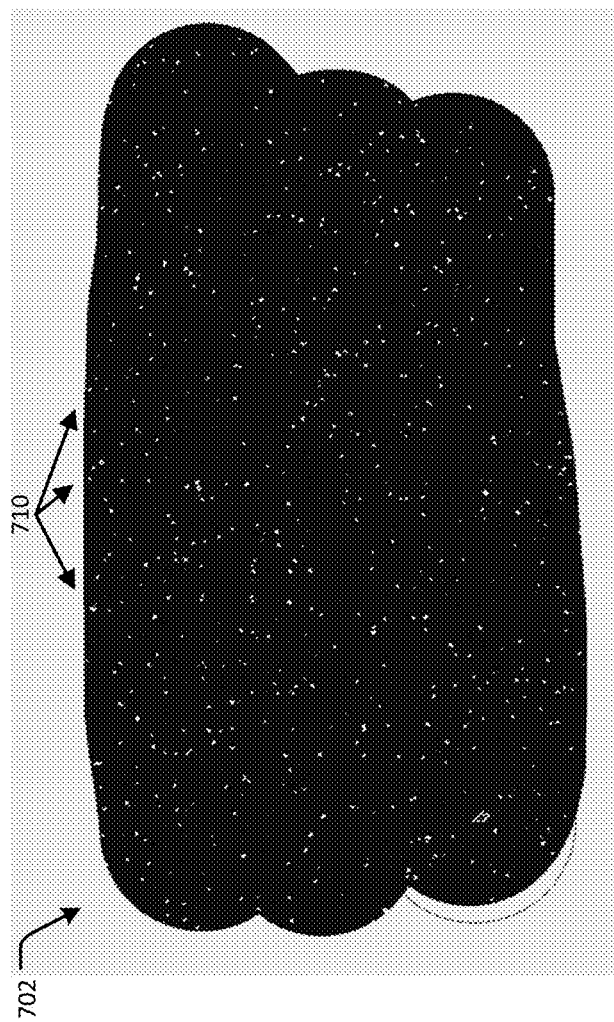
Figure 7C:
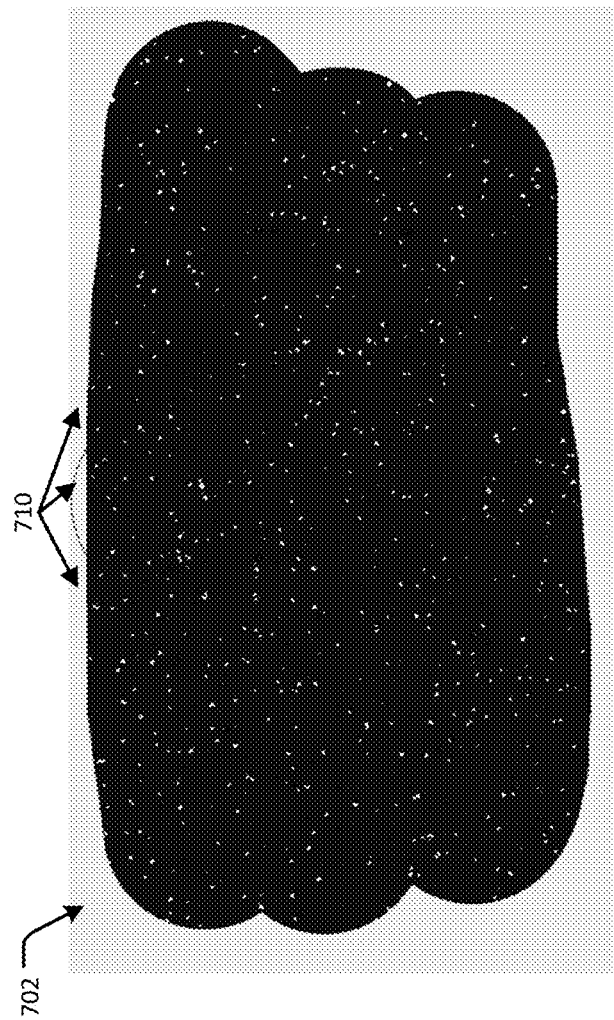
Figure 7D:
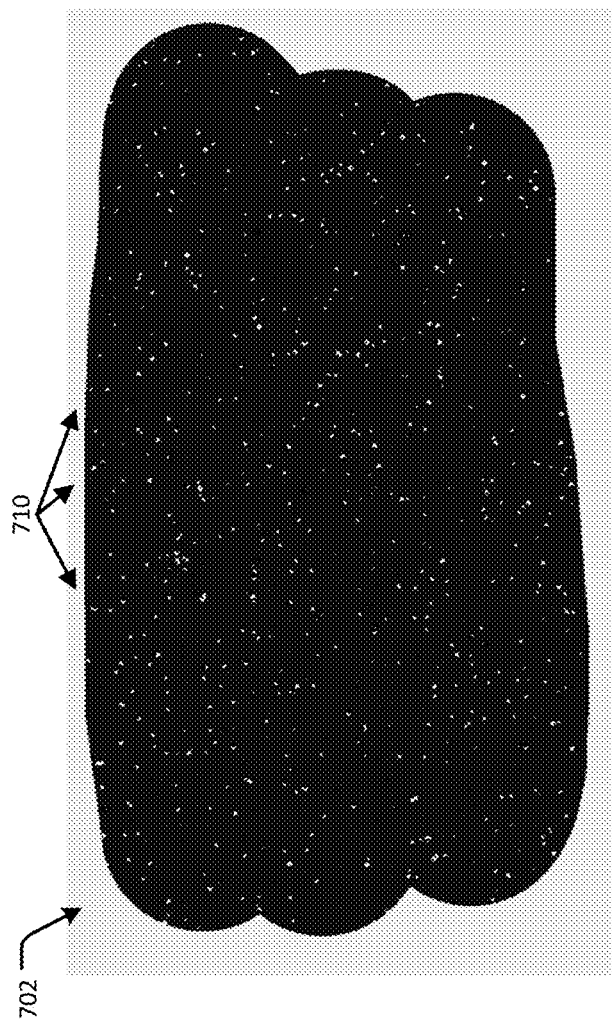

FIG. 7A illustrates the animation 702 approximately when the user has finished drawing the brush stroke. FIGS. 7B, 7C, and 7D illustrate successive frames of the animation 702, possibly with intervening frames omitted. As illustrated by FIGS. 7B, 7C, and 7D, as the animation 702 progresses, the elements 710 successively appear and disappear.

Example steps that an animation engine can perform when animating stars in a night sky will now be discussed.

A first example step is to initialize an array called "coords" that can store the coordinates of the brush stroke area.

The second step is to draw a line between a previous position of a pointer to current position, where the line may be drawn when the user drags an onscreen pointer across the image. The line can be drawn as follows:

Line(previousMouseX, previousMouseY, mouseX, mouseY);

In some examples, the line is given the color black (r=0, g=0, b=0). In other examples, the line can be given a different color, which can be indicated by the parameters of the brush. Additionally, the line has a radius indicated by a "brushRad" variable.

The third step is to examine each pixel of the image, and if the pixel has brightness value that is less than one (e.g., the pixel is black or whatever color was drawn in the previous step), the coordinates of the pixel are added to the coords array.

The fourth step is to input the coords array to the Starglow class, which is described below. The Starglow class can be rendered every "timeDelay" seconds. Once rendered, the coords array can be cleared, and the process can return to the third step.

The Starglow class will now be described. An instance of the Starglow class can receive a coordinate array, generated as in the third step above. The class can generate an array of random values that will be used to determine the radius of a corresponding star. The random values can also indicate whether the star is to be displayed and/or a color for the star. The class can further include an internal iterator, which can change the radius of the star between a maximum, "maxRad," and a minimum of zero, and back. As noted above, the Starglow object can receive a coordinate array. For each point in the coordinate array, the Starglow object can run the iterator that varies the star radius. Each star element can be a circle and/or a scalable vector graphic in the shape of to star.

The chaos brush is an example animation brush that is a variant of the night sky brush. Example steps that an animation engine can perform to produce an animation drawn with the chaos brush will now be described.

A first example step is to initialize an array called "coords" that can store the coordinates of the brush stroke area.

The second step is to draw a line between a previous position of a pointer to current position, where the line may be drawn when the user drags an onscreen pointer across the image. The line can be drawn as follows:
Line(previousMouseX, previousMouseY, mouseX, mouseY);

In some examples, the line is given the color black (r=0, g=0, b=0). In other examples, the line can be given a different color, which can be indicated by the parameters of the brush. Additionally, the line has a radius indicated by a "brushRad" variable.

The third step is to examine each pixel of the image, and if the pixel has brightness value that is less than one (e.g., the pixel is black or whatever color was drawn in the previous step), the coordinates of the pixel are added to the coords array.

The fourth step is to input the coords array to the Chaos class, which is described below. The Chaos class can be rendered every "timeDelay" seconds. Once rendered, the coords array can be cleared, and the process can return to the third step.

The Chaos class will now be described. Similar to the Starglow class, an instance of the Chaos class can render each star in the animation. The Chaos class can accept as input the coordinate array, coords, determined as described above. The Chaos class can iterate through each of the coordinates, and may randomly skip a set of coordinates, or skip coordinates based on values determined using perlin noise. For each coordinate that is not skipped, the class can draw an ellipse at the coordinate, which represents a star. Variables that can be controlled can include a color, brightness, density, radius, and so on.

A glitter brush is another animation brush where elements of the animation may not move, and instead vary in color. Example steps that the animation can perform to generate a glitter animation will now be described.

A first example step is to determine a base color, "bColor." The base color can be determined from the brush parameters, for example.

The second step is to determine a range of variations for the color saturation and brightness. The range of variations can be, for example, a 20% difference from the base color, or another percentage. The range can be specified by the user, for example.

The third step is to determine at least four stops for the colors, and to store the stops in an array, "ColorArray."

Once the user has drawn a brush stroke, the fourth step is to select all pixels in the image, as follows:
(int y=0; y<height; y++)
(int x=0; x<width; x++)

The fifth step is to select a random color "c" from the array, Color Array. Perlin noise may be used to select the color, for example when the color changes are to be gradual. The color can be selected as follows:
c=ColorArray[random(0, 4)];

The sixth step is to select every 'k' th pixel in the array, where k is a spacing. This gives a grid. For example, x and y coordinates can be selected from the array when the following condition is true:
(x % k==0||y % k==0)

The seventh step is to iterate from 0 to m, where m<k, as follows:
(int m=0; m<k; m++)

The eighth step is to select pixels above, below, left, and right from a coordinate determined in the sixth step, and to assign these pixels the color c, as follows:
pixels[(x−m)+(y−m)]=c;
pixels[(x+m)+(y−m)]=c;
pixels[(x−m)+(y+m)]=c;
pixels[(x+m)+(y+m)]=c;

The ninth step is to render the image once per a frame rate, upon which the changing color values will give a glitter effect.

In some examples, the pixels selected in the eight step can be selected in a different combination of directions, which can change the effect. In some examples, the colors used can be a different mix of colors, which can also change the effect.

FIGS. 8A-8D illustrate another example image 800 that includes an animation 802 drawn using an animation brush. In this example image 800, the animation brush was a "pale sky" brush, or a brush that draws clouds over a blue sky. The animation elements 810, in this case, are clusters of white and/or grey pixels that change in density, size, and location over the course of the animation.

Parameters of the pale sky brush that can be controlled can include, for example, the background color (e.g., the color of the sky), the colors of the clouds, the speed at which the clouds move, the direction in which the clouds move, the density of the clouds, and an amount of the background that remains visible, among other examples. Audio that can accompany the sky animation 802 can include, for example, wind sounds, or the sounds of a particular location. The parameters of the sky animation 802 can be linked to, for example, a weather data feed.

Figure 8A:
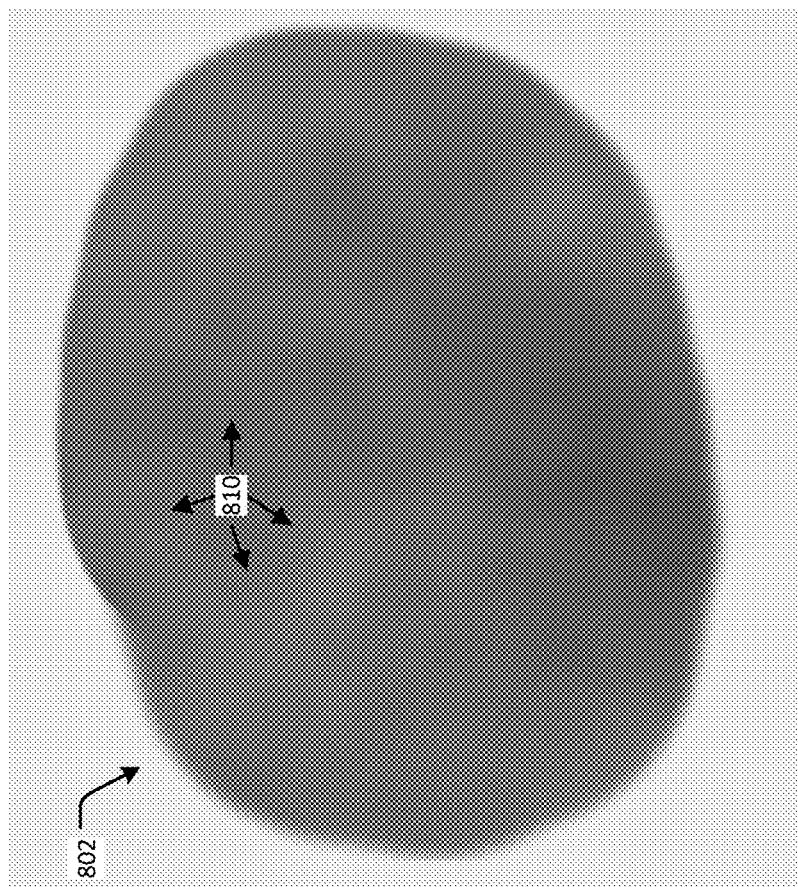
FIGS. 8A-8D illustrate another example image that includes an animation drawn using an animation brush.
Figure 8B:
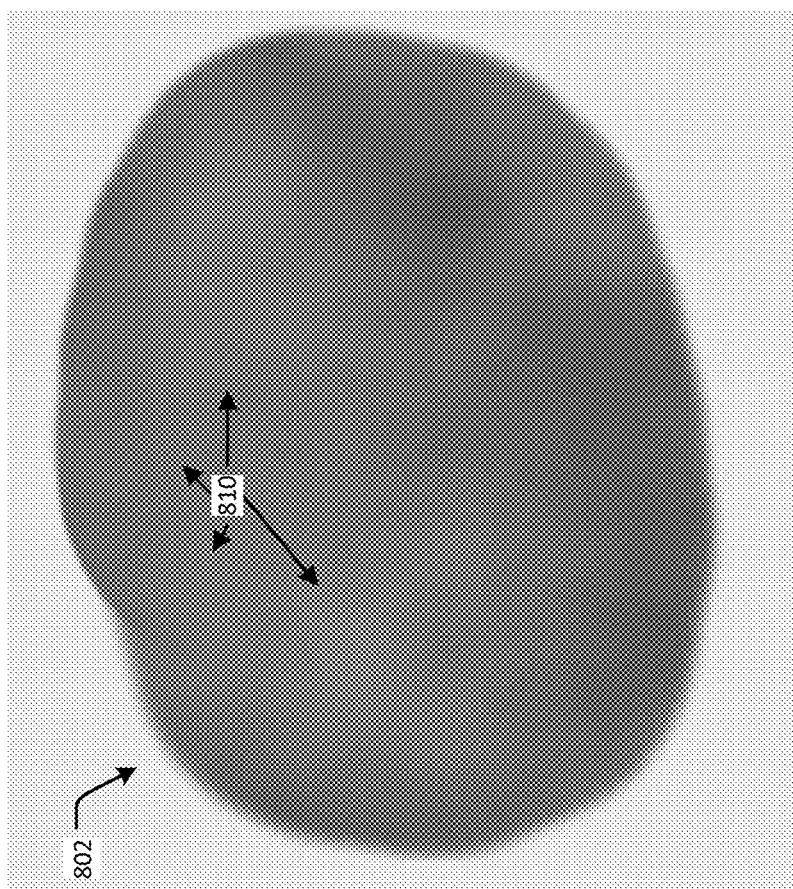
Figure 8C:
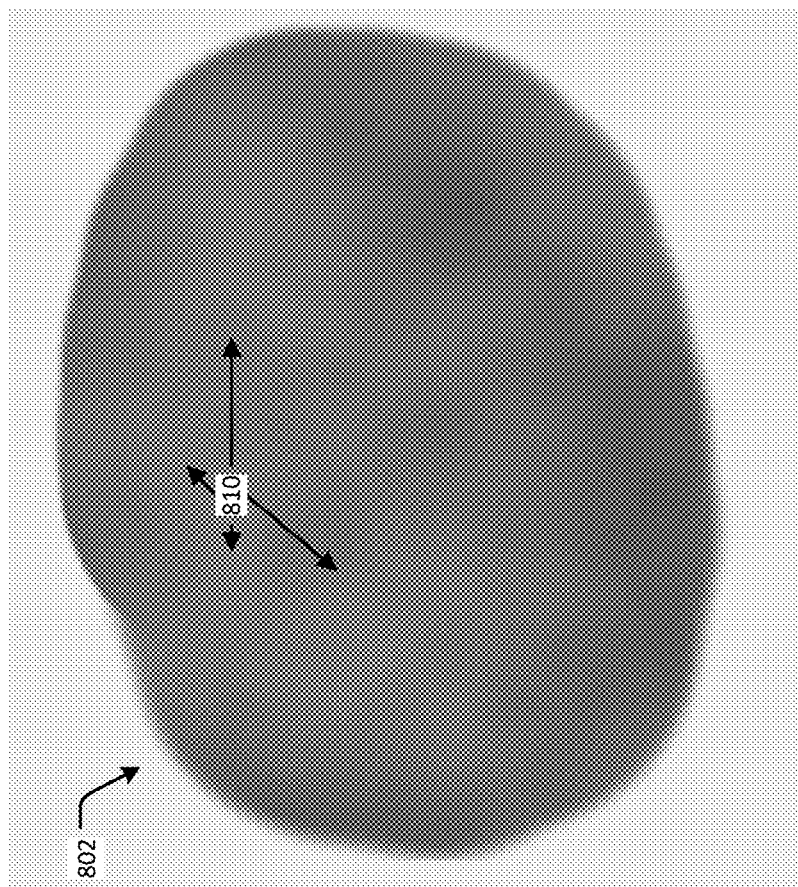
Figure 8D:
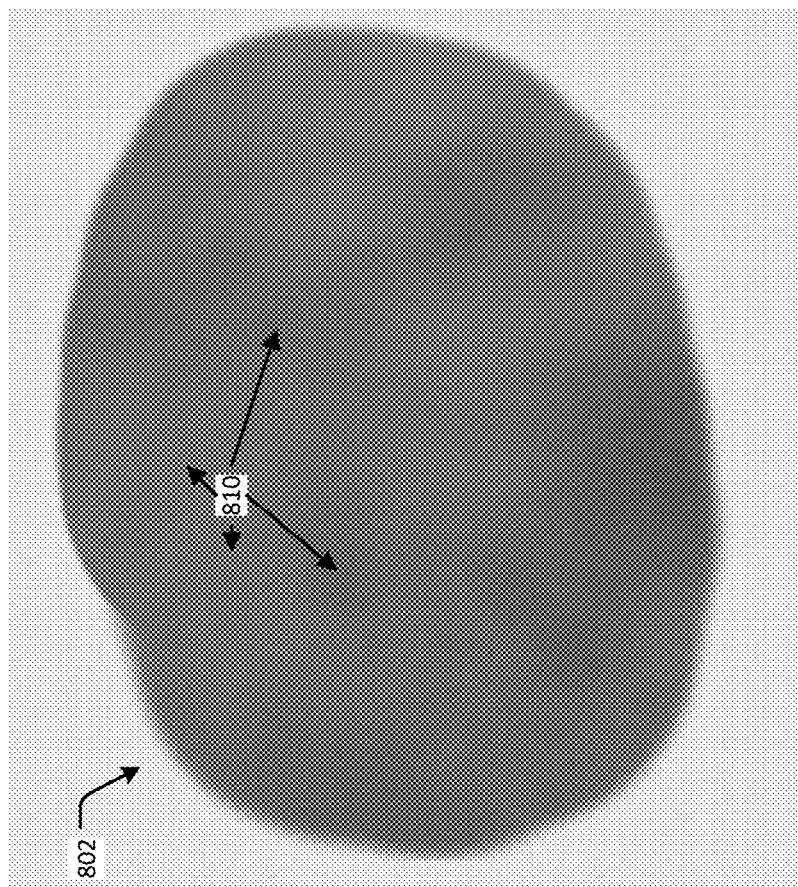

FIG. 8A illustrates the animation 802 approximately when the user has finished the brush stroke. At this point in time, the animation engine determines an initial location and density of the cloud elements 810. FIGS. 8B, 8C, and 8D illustrate successive frames of the animation 802, possibly with intervening frames omitted. As illustrated by FIGS. 8B, 8C, and 8D, as the animation 802 progresses, the cloud elements 810 become more or less dense, and drift in various directions within the area of the brush stroke.

In various examples, other animations can be produced using similar shape characteristics and animation parameters. For example, animation brushes for smoke and fire can produce animations that behave in a similar fashion.

Example steps that an animation can perform when animating fire will now be discussed. In various examples, smoke and fire can be animated using similar principles.

A first example step is to generate an image that will be used as a mask when generating the animation. This image will be referred to as the mask image. It is assumed that another image, in which the user is drawing, is open in the image editor. This image will be referred to as the drawer image.

Once the user has drawn a brush stroke, which will occur in the drawer image, the second step, which may be optional is to apply a blur filter to remove ragged edges of the brush stroke.

The third step is to initialize x, y, and z offsets, "xoff", "yoff", and "zoff" to zero.

The fourth step is to iterate over each coordinate in the drawer image, as follows:

for (y=0; y<height; y++) { . . . }
for (x=0; x<width; x++) { . . . }

The fifth step is to user perlin noise to obtain color value variations, and to assign color values obtained in this fashion to a variable "r." The output of the function can be multiplied by 255 to cover the range of Red-Green-Blue (RGB) values. An example of this fifth step is as follows:

r=noise(xoff,yoff,zoff)*255;

The sixth step is to assign a color according to r. The color for fire, for example, is red=255, green=r, blue=0. In some examples, such as when animated clouds in a blue sky, saturation values can be varied in a similar fashion.

The seventh step is to draw a point with the color determined in previous step at every x and y location.

The eight step is to increment xoff, yoff, and zoff by variables a, b, and c, which can be varied to get different forms of turbulence, direction, density, speed, and so on.

The ninth step is to mask the drawer image with the mask image.

FIGS. 9A-9D illustrate example image 900 that includes an animation 902 drawn using an animation brush. In this example image 900, the animation brush used to draw the animation 902 is for "neural nets," or animated visualizations of the activity of a network. In this animation 902, the animated elements are connections (illustrated using lines) that appear and disappear between stationary points within the area of the brush stroke. In some examples, the points are contained within the area of the brush stroke, while in other examples, parameters of the animation brush can allow the points to spread beyond the area of the brush stroke. In some examples, the points may not be stationary, and may gradually migrate to new locations. In some examples, connections drawn in one frame disappear in the next frame, and are drawn in a new location. In some examples, connects drawn in previous frames fade instead of disappearing, meaning that the color of these connections changes, from frame to frame, to be closer to the background color.

Parameters of the neural nets brush that can be controlled can include, for example, a density of the points between which the connections form, a degree to which the points are scattered within and/or outside the area of the brush stroke, the speed at which the connections are redrawn, and the color or colors of the connections, among other examples. The parameters of the neural nets animation can be linked to, for example, the activity of an actual network.

Figure 9A:
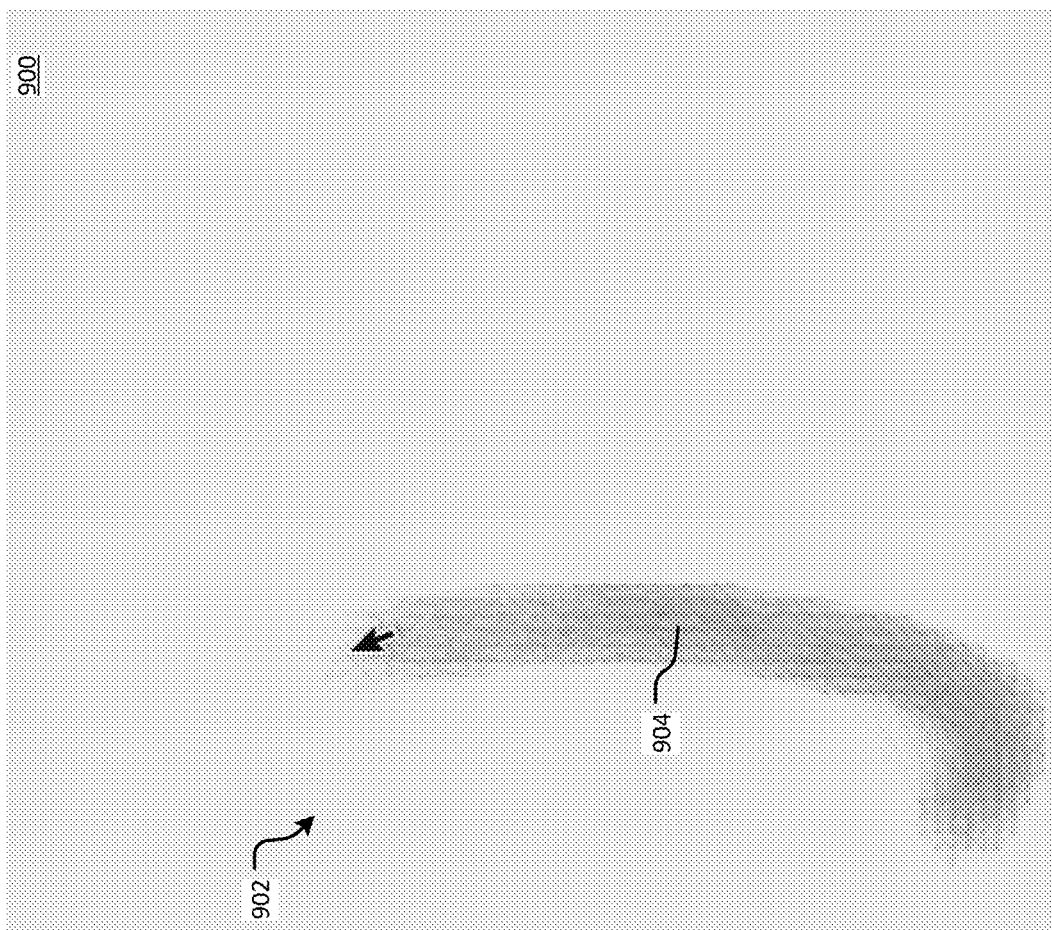
FIGS. 9A-9D illustrate example image that includes an animation drawn using an animation brush.
Figure 9B:
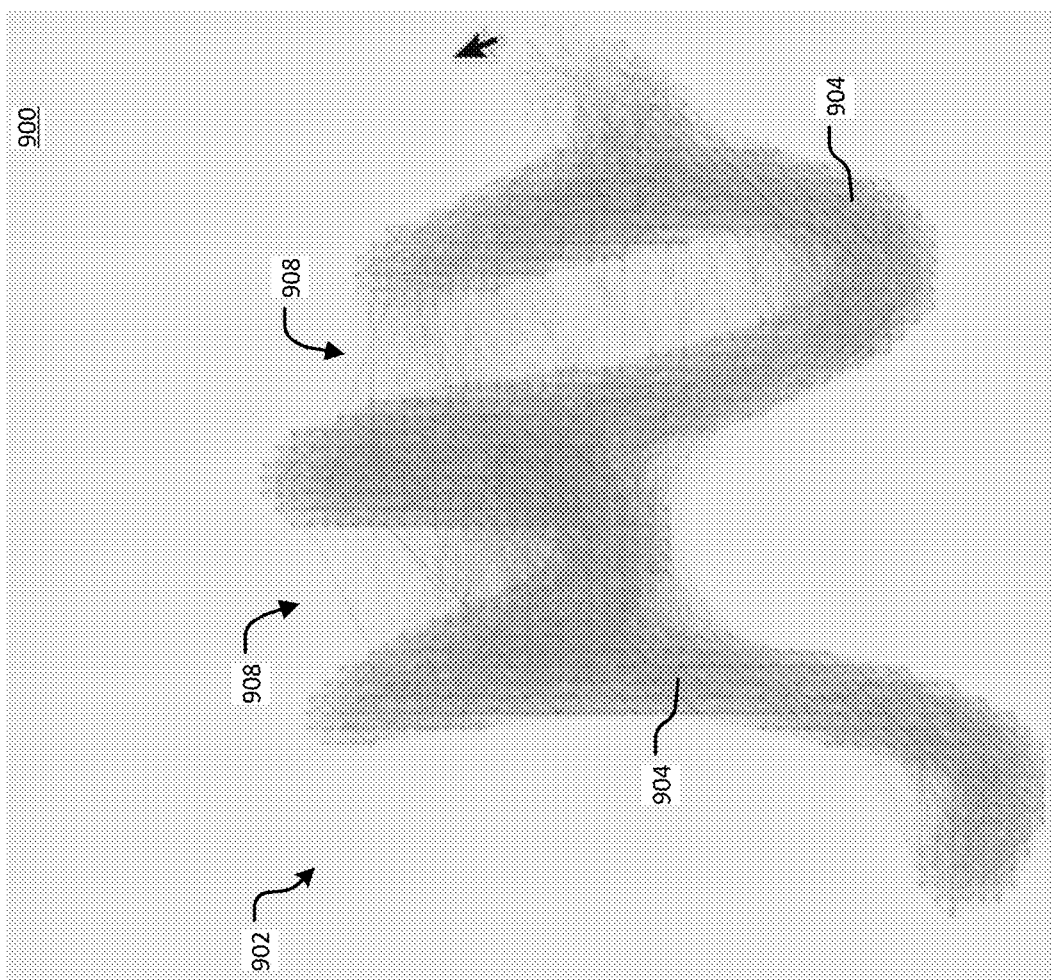
Figure 9C:
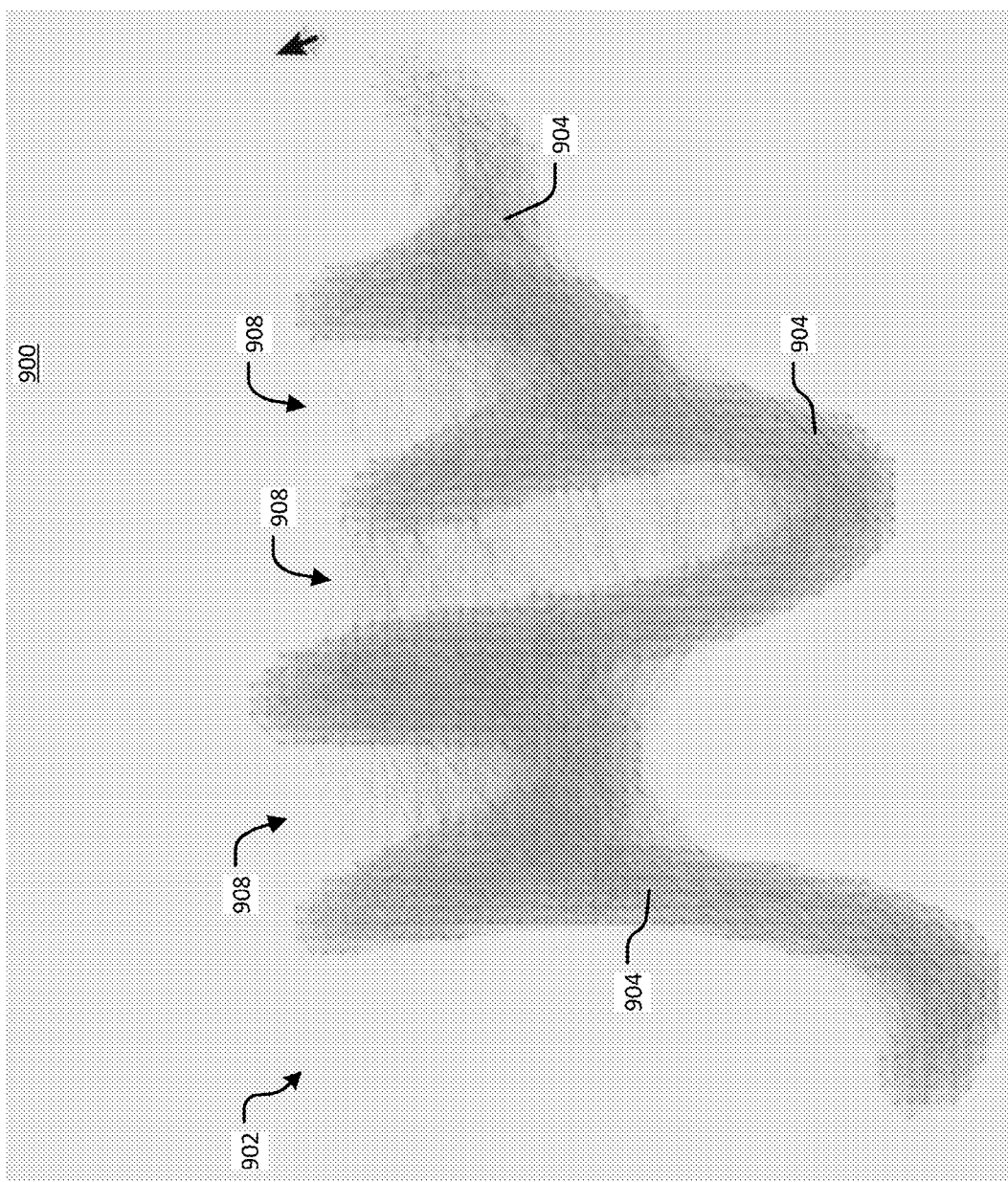
Figure 9D:

FIGS. 9A-9D illustrate a variation of the neural nets animation brush. As illustrated in FIG. 9A, the animation brush draws points within the area of the brush stroke, and the animation includes lines or connections between the points, which vary in location and intensity of color. As illustrated in FIG. 9B, the elements of the animation an also form connections between certain parts of the brush stroke. Specifically, in regions 904 where parts of the brush stroke are within a threshold distance, the animation can draw elements that jump across the regions 904 to form connections. FIGS. 9C and 9D illustrate subsequent portions of the same brush stroke, where the parts of the brush stroke are too far apart for connections to be drawn between these parts. In various examples, whether connections can be formed between parts of the brush stroke can be controlled using a parameter associated with the animation 902.

Figure 10:
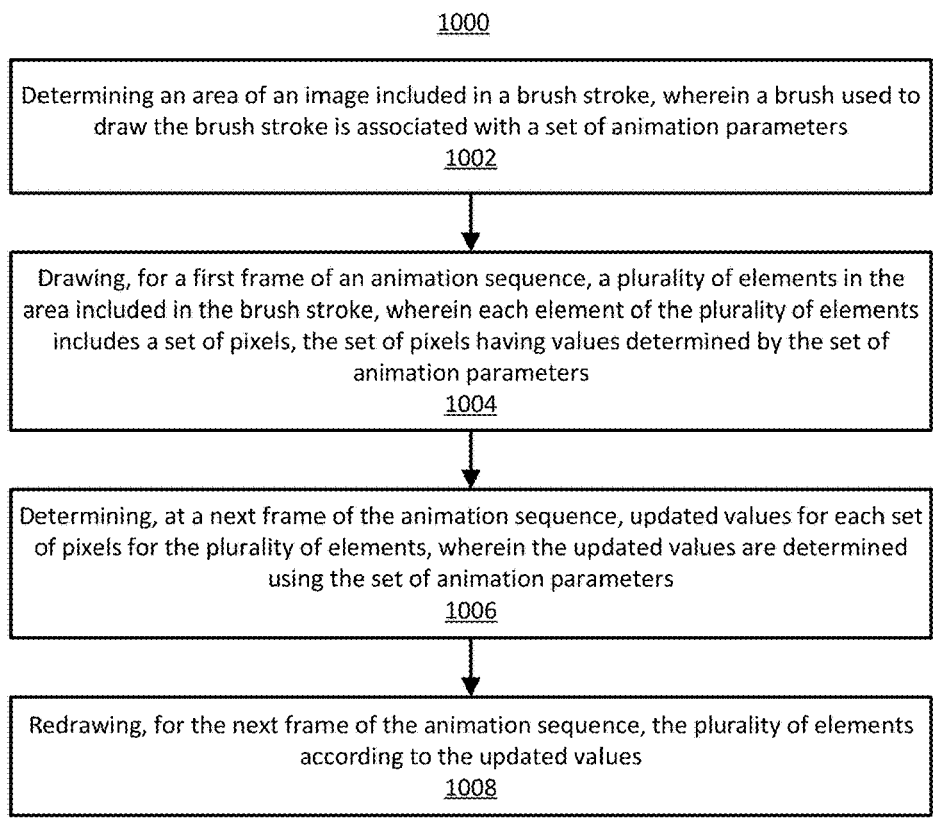
FIG. 10 includes a flowchart illustrating an example of a process for generating an animation using an animation brush.

FIG. 10 includes a flowchart illustrating an example of a process 1000 for generating an animation using an animation brush. In various examples, the example process 1000 can be implemented by an image editor of an image editing program, and/or by an animation engine included in the image editing program or invoked by the image editing program. The image editing program can be embodied in program instructions that can be executed by a computing device. For example, the computing device can include one or more processors and a non-transitory memory storing the program instructions. In this example, when the one or more processors execute the program instructions, the one or more processors perform operations including the steps of the process 1000. The program instructions can, alternatively or additionally, be stored on a non-transitory computer readable medium.

At step 1002, the process 1000 includes determining an area of an image included in a brush stroke, wherein a brush used to draw the brush stroke is associated with a set of animation parameters. In some examples, the brush is a digital tool of the image editor. In these examples, the brush can have one or more of a diameter, a shape, or edge characteristics. Also in these examples, application of the brush to the image causes modification of pixels where the brush is applied. In various examples, the brush determines a size and shape of the area included in the brush stroke. The area of the brush stroke can be provided as pixel coordinates, for example.

At step 1004, the process 1000 includes drawing, for a first frame of an animation sequence, a plurality of elements in the area included in the brush stroke, wherein each element of the plurality of elements includes a set of pixels, the set of pixels having values determined by the set of animation parameters. Drawing each element can include, for example, modifying pixel values in the image to set the pixel to a particular color value. In various examples, the set of animation parameters can include shape characteristics, color values, and/or location values, which can be used to determine where the pixels for each element should be placed, and what color the pixels should be. In various examples, the process 1000 can include using constrained random values to determine element shapes, colors, and/or locations. The random values can be constrained, for example, using a perlin noise technique.

In some examples, when drawn, one or more elements of the plurality of elements extend beyond the area included in the brush stroke. In some examples, drawing of the plurality of elements is constrained to the area included in the brush stroke. Whether the elements extend beyond the area of the brush stroke or are contained within the area of the brush stroke can be determined from shape and/or motion characteristics of the elements, among other parameters.

At step 1006, the process 1000 includes determining, at a next frame of the animation sequence, updated values for each set of pixels for the plurality of elements, wherein the updated values are determined using the set of animation parameters. The updated values can be determined using a constrained random number generator, for example. The random numbers can be constrained according to the shape characteristics of the elements, parameters that determine or limit the motion, color values for the elements, and/or the previous locations of the elements, among other factors. The random numbers can be constrained using a perlin noise technique, for example, to smooth transitions in the motions and enhance the naturalistic appearance of the animation.

At step 1008, the process 1000 includes redrawing, for the next frame of the animation sequence, the plurality of elements according to the updated values. Redrawing can include, for example, drawing the elements in new locations. Alternatively, redrawing can include modifying color values of the elements without redrawing the pixels of the elements in a different location. In some examples, the elements are drawn in new locations while pixels in the elements' previous locations are not erased. In these examples, the color values for the previously drawn elements may be modified, and/or the previously drawn elements may be deleted after a certain number of frames.

In some examples, the process 1000 further includes enabling output of audio data associated with the set of animation parameters. In various examples, the audio data can be controlled by the set of animation parameters, and thus by synchronized to the animation.

In some examples, the process 1000 further includes determining a data feed associated with the set of animation parameters, wherein the updated values are further determined using the data feed. The data feed can be received or obtained from the computing device on which the image editor is executing. Alternatively or additionally, the data feed can be received or obtained from a network location.

Figure 11:
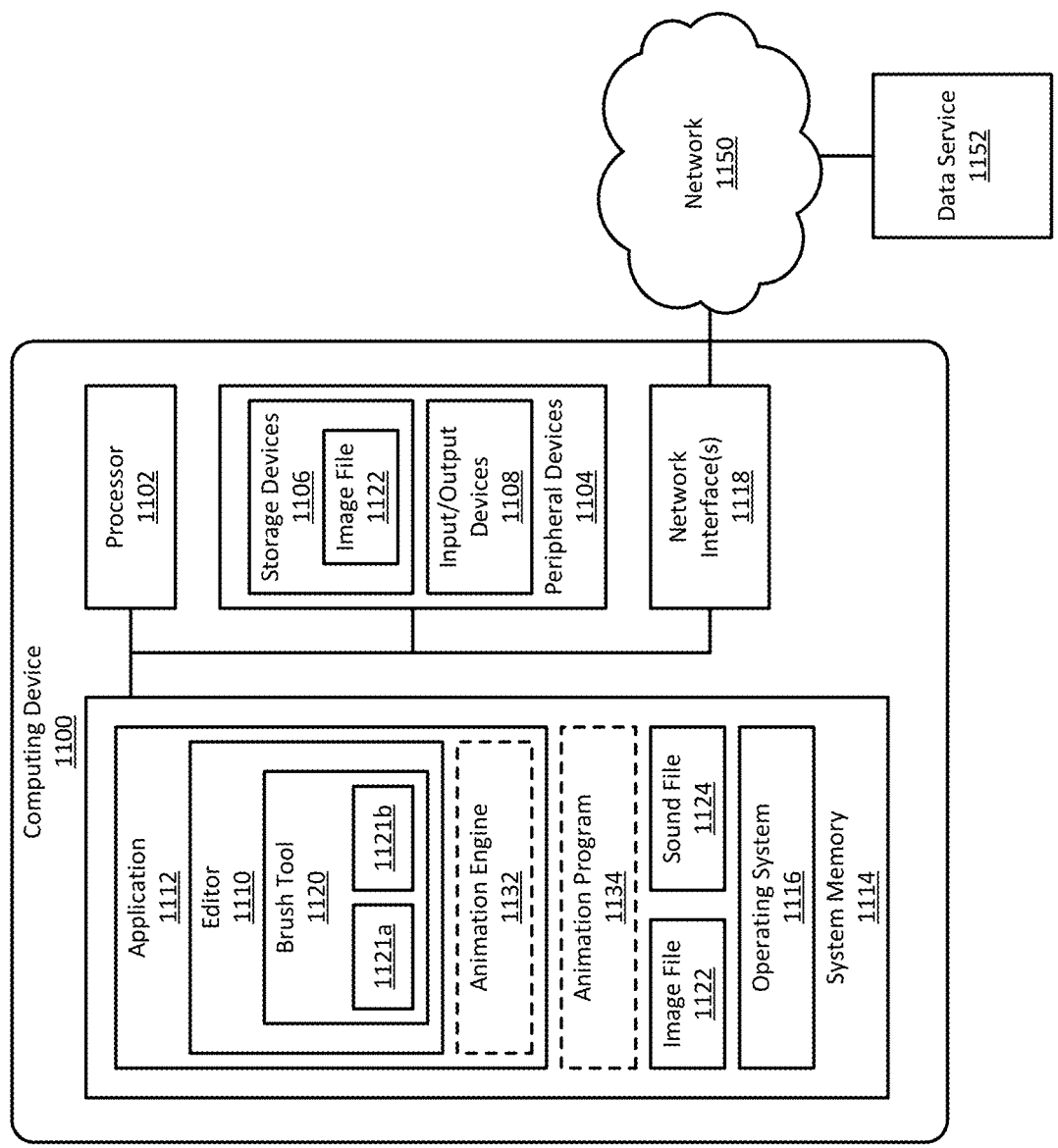
FIG. 11 includes a block diagram illustrating an example of a computing.

FIG. 11 includes a block diagram illustrating an example of a computing device 1100 on which an image editing program the includes animation brushes 1122a-1122b can be executed. The computing device 1100 can be, for example, a desktop computer, a laptop computer, a tablet computer, or a smartphone, among other examples. The example computing device 1100 can include various hardware components, including a processor 1102, a system memory 1114 (which can also be referred to as processor memory or main memory), peripheral devices 1104, and one or more network interfaces 1118, among other examples. When in operation, the computing device 1100 can also include software components, such as an operating system 1116 and an application 1112. The computing device 1100 can also include software components when not in operation, such as software stored as firmware on other memory devices in the computing device 1100, and/or software stored on storage devices 1106, among other examples.

The processor 1102 is an integrated circuit device that can execute program instructions. The program instructions can be for executing an operating system 1116 and/or an application 1112. When executed by the processor 1102, the instructions cause the processor 1102 to perform the operations of the program. When being executed by the processor 1102, the instructions are stored in the system memory 1114, possibly along with data being operated on by the instructions. The system memory 1114 can be a volatile memory storage type, such as a Random Access Memory (RAM) type. The system memory 1114 is sometimes referred to as Dynamic RAM (DRAM) though need not be implemented using a DRAM-based technology. Additionally, the system memory 1114 can be implemented using non-volatile memory types, such as flash memory.

The peripheral devices 1104 can include various hardware components that can add functionality to the computing device 1100. In the example of FIG. 11, the peripheral devices 1104 include storage devices 1106 and input/output devices 1108. The storage devices 1106 can include non-volatile storage devices, such as optical or magnetic disks, or solid state drives, among other examples. The storage devices 1106 can be internal (e.g., mounted within the same chassis as the other illustrated components) or external (e.g., in a separate enclosure and connected to the computing device 1100 using a cable. In some examples, the storage devices 1106 can be located on the network 1150. The input/output devices 1108 can include various devices and/or connectors for devices that enable information to be displayed to a user, and for the use to input data into the computing device 1100. For example, the input/output devices 1108 can include display devices (e.g., screens or monitors), speakers, headphones, and/or printers, among other examples. The input/output devices 1108 can further include keyboards, mice, touchscreens, digitizing tablets, microphones, motion sensors, and scanners, among other examples. The peripheral devices 1104 can include other devices not illustrated here, such as a graphics accelerator.

The network interfaces 1118, which are also a type of peripheral device, enable the computing device 1100 to communicate with a network 1150. The network interfaces 1118 can include, for example, a socket for connecting a network cable and/or one or more antenna for communicating with wireless networks. When the network interfaces 1118 include more than one interface, the computing device 1100 may be able to communicate with different networks at the same time. The network 1150 can include private (e.g., firewalled and accessible only with authentication credentials) networks and/or public networks, such as the Internet.

The operations of the computing device 1100 can be coordinated and controlled by the operating system 1116. The operating system 1116 can, for example, cause the processor 1102 to load and execute applications activated by a user, such as the example application 1112 illustrated in FIG. 11. As a further example, the operating system 1116 can control access to and use of the hardware of the computing device 1100 by applications executing on the computing device 1100.

The example application 1112 of FIG. 11 can be an image editing program that includes animation brushes. The application 1112 thus includes an editor 1110 in which a user can load an image for editing. The image may be loaded form an image file 1122 stored on one of the storage devices 1106 of the computing device 1100. Alternatively, the image file 1122 may be loaded over the network interfaces 1118 from a network location. Once loaded, the image file 1122 for the image may also be present in the system memory 1114.

The editor 1110 can include various tools for editing and/or modifying an image, including a brush tool 1120. The brush tool 1120 can enable a user to draw or paint on the image, where parameters of the brush tool 1120 determine the pixels that are affected by the drawing or painting and/or the color values that are applied to the pixels. The brush tool 1120 can, for example, define a diameter and/or shape of the brush strokes formed through use of the brush tool 1120, as well as a pixel color or colors, flow or the degree to which color is applied to pixel locations, and other parameters.

In various examples, the editor 1110 can include pre-defined brushes that have a preconfigured set of parameters. In various examples, the pre-defined brushes can include one or more animation brushes 1121a-1121b. As discussed above, the animation brushes 1121a-1121b enable a user to paint an area of the image, and the editor 1110 can automatically generate an animation in the area. In various examples, each of the animation brushes 1121a-1121b outputs a different type of animation, such as hair, rain, or smoke, among other examples. By being enabled through the brush tool 1120, the animation brushes 1121a-1121b can make use of brush parameters such as diameter, shape, and/or flow, among others. The animation brushes 1121a-1121b further each have parameters specific to the brush, that enable the user to modify the animation.

In various examples, the application 1112 can include an animation engine 1132 that can control the animation, and output the frames of the animation. As discussed above, the animation engine 1132 can, for each frame of the animation, determine shapes, colors, and locations for the elements of the animation. The animation engine 1132 can further redraw the elements within the image, while the image is open in the editor 1110. In some examples, the animation engine 1132 is a component of the application 1112. In some examples, the application 1112 can invoke an animation program 1134 that is external to the application 1112. In these examples, the animation program 1134 executes as a separate process from the application 1112.

Some animation brushes 1121a-1121b can generate animations that include audio. The audio for these animations may be built into the application 1112, and/or may be obtained from a sound file 1124. The sound file 1124 can be read from, for example, the storage devices 1106 or from a network location, and can loaded into the system memory 1114 when the audio for an animation is enabled.

Some animation brushes 1121a-1121b can generate animations that can be controlled by a data feed. In some examples, the data feed can be produced by hardware and/or software of the computing device 1100. For example, the data feed can come from the input/output devices 1108 and/or other peripheral devices, such as accelerometers, gyroscopes, temperature sensors, motion sensors, and so on. In some examples, the data feed can come from a data service 1152 on the network 1150. For example, the data feed can come from a weather service, a data tracking service such as a stock market ticker, a statistics gathering service, a web camera, a social media feed or live stream, or another online data source.

Figure 12:
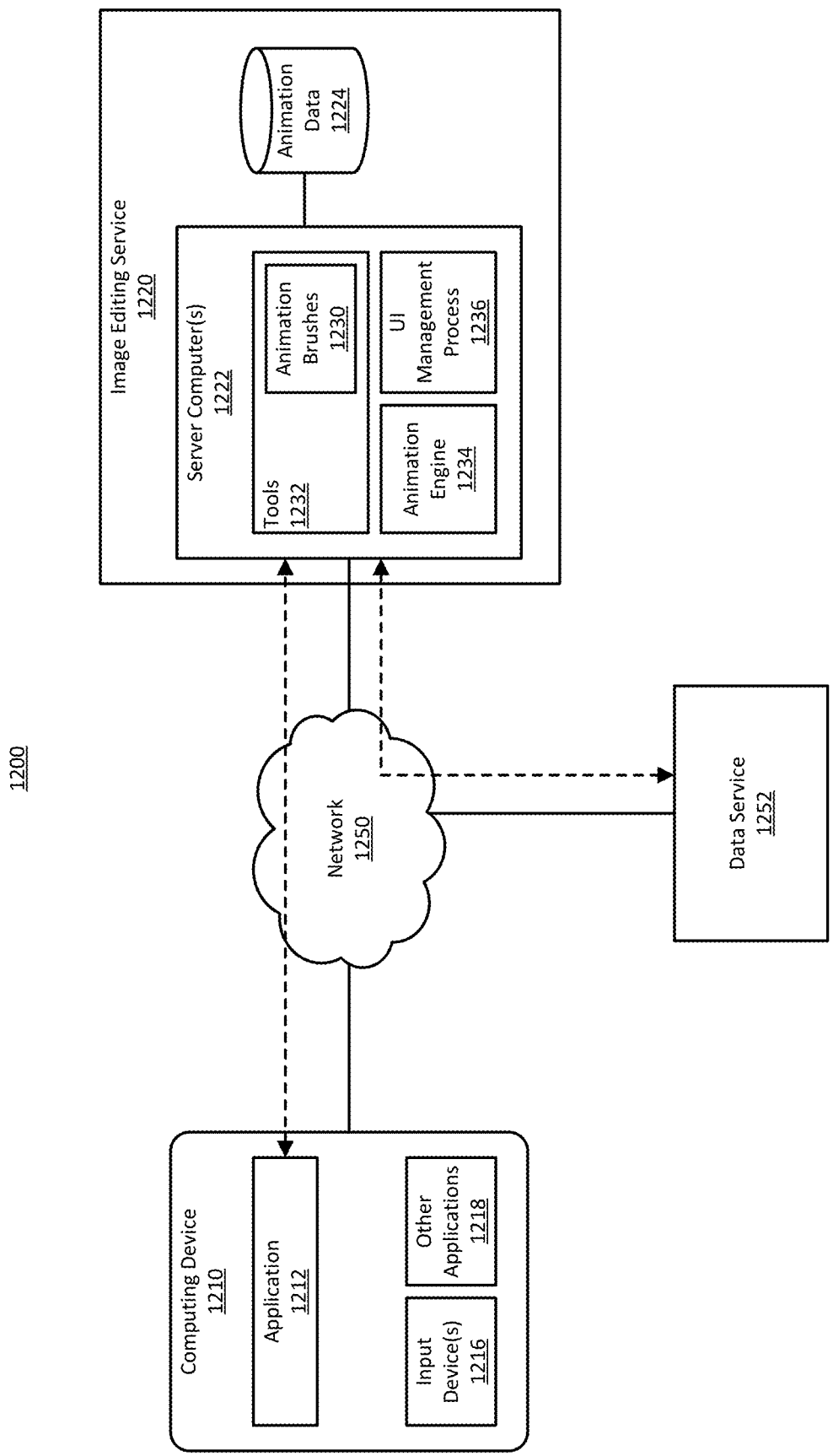
FIG. 12 is a diagram illustrating an example of an image editing.

FIG. 12 is a diagram illustrating an example of an image editing system 1200, which can be used to edit images on a computing device 1210. In various examples, the image editing system 1200 includes an image editing service 1220 that can provide image editing services to computing devices, such as a computing device 1210 illustrated in FIG. 12. In various examples, the image editing service 1220 can communicate with the computing device 1210 over a network 1250, which can include private networks and/or public networks such as the Internet. In some examples, the image editing service 1220 can optionally communicate over the network 1250 with a data service 1252 that can provide data feeds that can be used to control animations.

The computing device 1210 of this example can include various types of electronic devices that include a microprocessor capable of executing instructions of computing code, memory for storing the instructions and/or other data, and network capability, such as a wired or wireless network card and/or a cellular antenna. Examples of such electronic devices include laptop computers, desktop computers, tablet computers, smart phones, personal digital assistants, smart watches, digital eyeglass systems, internet televisions, game consoles, and others.

The computing device 1210 can be associated with one user or multiple users. A user, in this context, is a digital entity that is maintained by a computing system, and for which various types of digital identifiers may exist that associate data with the user. For example, a user can be identified to a computing system by a username, which can be an alphanumeric string. In this example, the username can be associated with a user account on the computing system and/or on a network. The user account can further be associated with authentication data, such as a password, a security token, bioinformatic data, or other data that can be used to give a person access to the account, or to give the account access to the computing system. As another example, a user can be identified by an email address, a social media handle (e.g., a type of username), a gaming handle, a mobile telephone number, or another type of identifier. In some examples, one user can be associated with multiple user accounts. In some examples, one user can be associated with multiple email addresses, social media handles, or other identifiers. In some examples, more than one person (e.g., a human being) can be associated with the same user. For example, a team of network administrators may each have access to the same user account.

In various examples, the computing device 1210 can include hardware and software that enable the computing device 1210 to interact with the image editing service 1220 so that a user can make use of the image editing operations of the image editing service 1220. For example, the computing device 1210 can execute an application 1212 through which a user can interact with the image editing service 1220 to edit an image. The application 1212 can be one provided by the image editing service 1220. The application 1212 can include a graphical user interface that can be output using a display of the device 1210, and through which a user can view an image. The application 1212 can further enable access to the editing capabilities of the image editing service 1220. The computing device 1210 can further include input devices 1216, such as a mouse, a trackpad, a keyboard, a digitizing tablet, a touchscreen, and/or microphones, that enable the user to perform editing operations. In various examples, other applications 1218 can also be executing on the computing device 1210.

In various examples, the image editing service 1220 can be implemented using various software processes executing on or more server computers 1222. The software processes can include, for example, editing tools 1232, an animation engine 1234, and a user interface (UI) management process 1236, among others. The image editing service 1220 can further include one or more data stores to store data such as animation data 1224, among other data. The data stores can be implemented using, for example, hard drives, solid state drives, or another form of non-volatile storage memory.

The server computers 1222 on which the processes execute can be computing devices that include one or more processors capable of executing program instructions and memory for storing the program instructions. The server computers 1222 and the data stores can, for example, be housed in a data center and/or provided as a service from a data center. Alternatively or additionally, the server computers 1222 and the data stores can be housed in a network operated and controlled by the image editing service 1220.

The tool 1232 can be various processes that enable the user to make changes to an image. The tools 1232 can include, for example, editing tools, drawing tools, and/or selection tools, among other examples. In various examples, the tools 1232 can include animation brushes 1230 that enable the user to draw animations in an image. The animation brushes 1230 can include various types of predefined brushes, such as brushes for drawing hair, rain, fire, stars in a night sky, and so on. Shape and animation data for each of the animation brushes 1230 can be stored in the data store for the animation data 1224.

The animation engine 1234 of the image editing service 1220 can further generate and control animations drawn using the animation brushes 1230. The animation engine 1234 can, for example, determine when the next frame of the animation is to be output. The animation engine 1234 can further use shape, color, and location data for the animation to redraw the elements of the animation with different colors and/or in new locations. The animation engine 1234 can output the frames of the animation over the network 1250 to the application 1212, for display in the application 1212. In various examples, the animation engine 1234 can also determine audio to be output with an animation. In these examples, the animation engine 1234 can transmit the audio over the network 1250 to the application 1212, for outputting by the application 1212.

In various examples, a data feed from the data service 1252 can be linked to an animation drawn using one of the animation brushes 1230. In these examples, the image editing service 1220 can get (e.g., pull) or receive (e.g., through a push mechanism) data from the data service 1252. The image editing service 1220 can supply data from the data feed to the animation engine 1234, for the animation engine 1234 to use in generating the frames of the animation.

The user interface management process 1236 can manage the transfer of data between the image editing service 1220 and the user interface of the application 1212, so that user does not experience delay while using the application 1212. For example, the user interface management process 1236 can coordinate receipt of brush stroke data from the application 1212 with the animation frames produced by the animation engine 1234. As another example, the user interface management process 1236 can receive animation parameter changes input into the application 1212, and can transmit the modified parameter values to the animation engine 1234. The image editing service 1220 can further include other processes that are not illustrated here.

Figure 13:
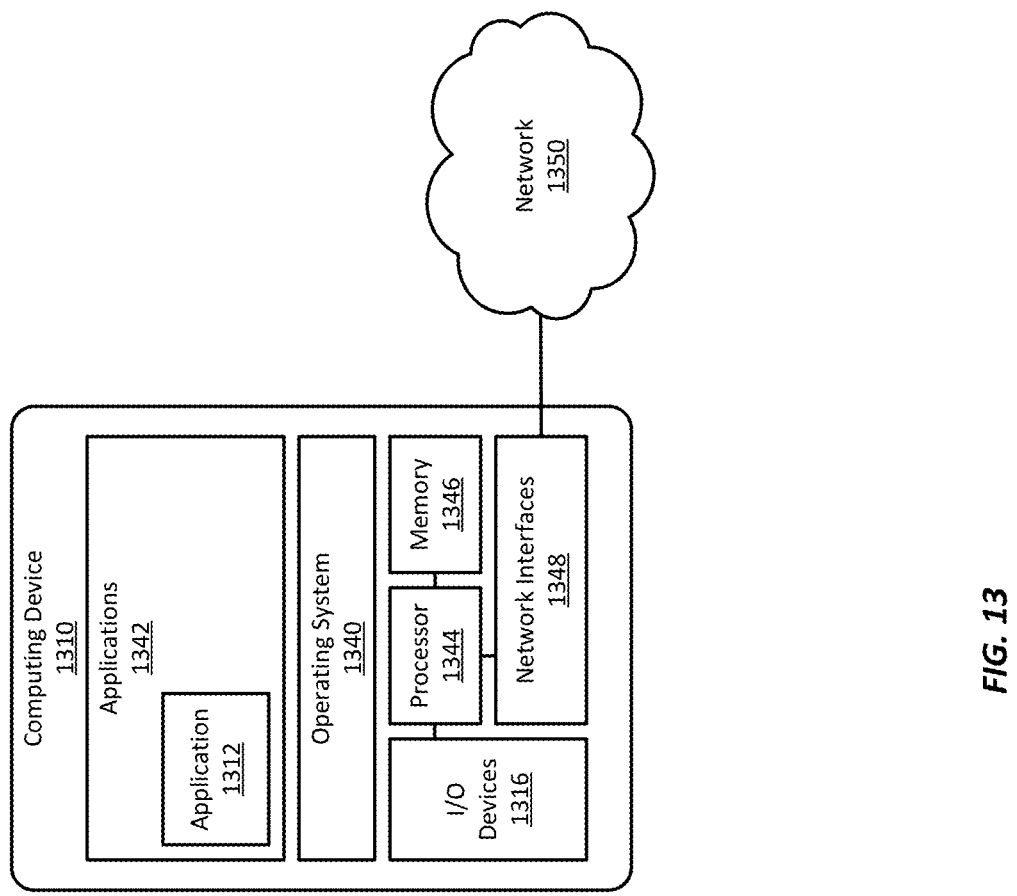
FIG. 13 includes a block diagram illustrating an example of a computing device illustrated in FIG. 12.

FIG. 13 includes a block diagram illustrating an example of a computing device 1310, such as the computing device illustrated in FIG. 12. The example computing device 1310 of FIG. 13 can include various software components and software components, which can be used in various combinations to access an image editing service from the computing device 1310.

In various examples, the software components can include an operating system 1340 and applications 1342. The operating system 1340 can manage the various operations of the computing device 1310, including the applications 1342 executing on the computing device 1310 and the computing device's hardware. The applications 1342 can include programs accessible to a user of the computing device 1310, including a delivery application 1312, through which the user can interact with the image editing service.

In various examples, the hardware components can include a processor 1344, memory 1346, Input/Output (I/O) devices 1316, and network interfaces 1348, among other components. The processor 1344 can be an integrated circuit device that is operable to execute program instructions, including the instructions for executing the operating system 1340 and the applications 1342. The memory 1346 can store the program instructions while the processor 1344 is executing the instructions, and/or while the computing device 1310 is powered off. In various examples, the computing device 1310 can include multiple memories, including volatile and/or non-volatile memories. Non-volatile memories can also be described as non-transitory. The I/O devices 1316 can include user input and output devices, such as display screens, touch screens, keyboards, mice, and so on. The I/O devices 1316 can further include location devices, such as a Global Positioning System (GPS) receiver. The network interfaces 1348 can include wired and/or wireless network devices, such as a network port, a Wi-Fi antenna, and/or cellular antennas, among other examples. The network interfaces 1348 can enable the computing device 1310 to communicate with a network 1350, including, for example, the Internet.

Figure 14:
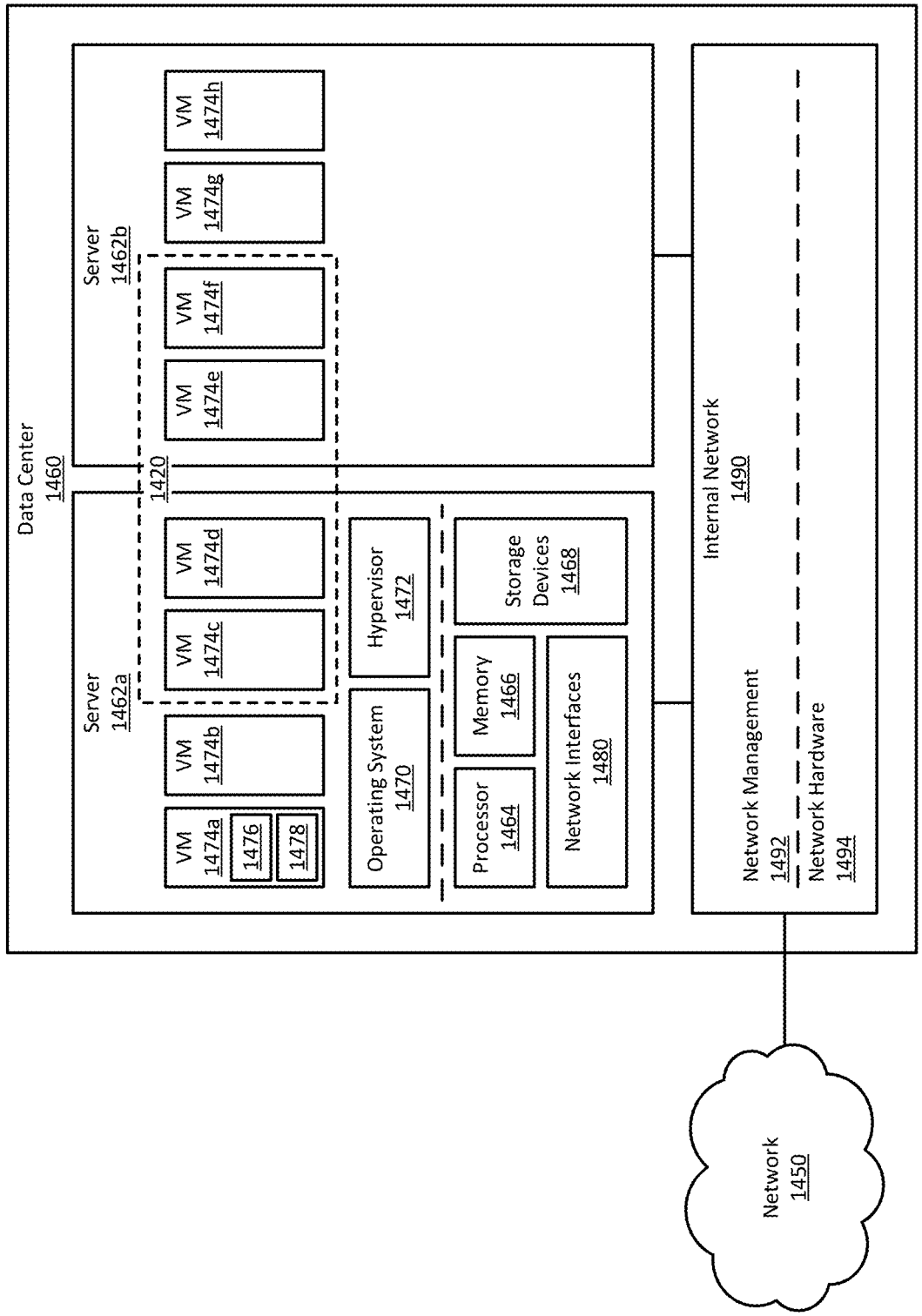
FIG. 14 includes a block diagram illustrating an example of a data center, which can host an image editing service.

FIG. 14 includes a block diagram illustrating an example of a data center 1460, which can host an image editing service 1420, such as the image editing service illustrated in FIG. 12. The data center 1460 can be operated by an entity other that the entity that controls the image editing service 1420, and may be leasing resources to the operator of the image editing service 1420. Alternatively, the data center 1460 may be operated by the entity that controls the image editing service 1420.

The data center 1460 can include multiple servers 1462a-1462b, of which two are illustrated here. A server can be a computing device configured primarily for being accessed over a network, and possibly for simultaneous use by multiple, unrelated users. An example of a configuration of a server is illustrated by a first server 1462a in FIG. 14. As illustrated by the first server 1462a, a server can include a software layer and a hardware layer.

The software layer can include, for example, an operating system 1470 a hypervisor 1472, and virtual machines 1474a-1474d, among other software and applications. The operating system 1470 can control and coordinate the operations of the first server 1462a, including execution of the hypervisor 1472, the virtual machines 1474a-1474d, and operation of the hardware. The hypervisor 1472, which can also be referred to as a kernel-based virtual machine (KVM) or a virtual machine monitor (VMM), can manage the virtual machines 1474a-1474d. For example, the hypervisor 1472 can handle operations such as bringing up new virtual machines, use of the virtual machines of the first server's hardware, and taking down virtual machines, among other operations. In some examples, the hypervisor 1472 is integrated into the operating system 1470.

A virtual machine is an emulated computer system running on the hardware of a physical computer system. As illustrated by a first virtual machine 1474a, a virtual machine can include a virtual representation of computer hardware 1478, which may but need not map to the physical hardware of the computing system on which the virtual machine is running. The virtual machine can further include software 1476 that is running on top of the virtual hardware 1478. The software 1476 can include an operating system and applications that are separate and distinct from the operating system 1470 and applications of the first server 1462a. As with physical computing systems, virtual machines can be isolated from one another, and a user operating within one virtual machine may be unaware of the existence of other virtual machines on the same system. The virtual machines 1474a-1474h illustrated in FIG. 14 can each have a similar configuration as is illustrated for the first virtual machine 1474a, with variations in the software executed and/or the particular configuration of the virtual hardware.

The hardware layer of the example first server 1462a can include a processor 1464, memory 1466, storage devices 1468, and a network interface 1480, among other hardware. The processor 1464 is an integrated circuit device operable to execute program instructions, including the instructions for the programs executing in the software layer of the first server 1462a. In some examples, the first server 1462a can include multiple processors. In some examples, a processor can include multiple processing cores. While the processor 1464 is executing program instructions, the program instructions can be stored in the memory 1466. In various examples, the memory 1466 can be volatile memory and/or non-volatile memory. In various examples, the first server 1462a can include multiple different memories. The storage devices 1468 can include non-volatile storage systems, such as hard drives, flash drives, and/or solid state drives, among other examples. While not being executed, and, in some cases, while being executed, program instructions can be stored on the storage devices 1468. The memory 1466 and the storage devices 1468 illustrate two examples of non-transitory computer-readable mediums. The network interfaces 1480 can include hardware and software for connecting the first server 1462a to a network, such as the internal network 1490 of the data center 1460. In some examples, the first server 1462a can include multiple network interfaces 1480 so that the first server 1462a can maintain multiple connections to the internal network 1490.

In various examples, other servers in the data center 1460, such as a second server 1462b, can be configured similarly to the first server 1462a, possibly with variations in the software being executed, the number of virtual machines running at any given time, and/or variations in the hardware included in the server.

The internal network 1490 of the data center 1460 can connect the servers 1462a-1462b of the data center 1460 to each other and to external networks 1450, such as the Internet. The internal network 1490 can include network management 1492 software, which can perform operations such as balancing the workload on each of the servers 1462a-1462b, bringing up and taking down servers, and/or assigning the data center's customers to servers and/or virtual machines on the servers, among other operations. The internal network 1490 can further include network hardware 1494, such as the routers, switches, hubs, and gateways that form the internal network 1490.

A customer of the data center 1460 can include the image editing service 1420. The image editing service 1420 can, for example, be assigned one or more virtual machines in the data center 1460, which the image editing service 1420 can use for executing the various processes of the image editing service 1420. The data center 1460 can be configured such that the operator of the image editing service 1420 need not know where the virtual machines assigned to the image editing service 1420 are executing. In the example of FIG. 14, the image editing service 1420 has been assigned several virtual machines executing on the first server 1462a and several executing on the second server 1462b. In various examples, the data center 1460 may determine to move the image editing service 1420 to different servers, and may thus migrate the operations of the image editing service 1420 from one virtual machine to another.

In various examples, the operator of the image editing service 1420 can access the virtual machines assigned to the image editing service 1420 from the network 1450. For example, the data center 1460 can provide a console or graphical user interface through which the operator can configure the virtual machines. In various examples, the data of the image editing service 1420 can be stored on the storage devices 1468 of the servers, and/or on network attached storage devices in the data center 1460.

The services of the image editing service 1420 can further be provided over the network 1450 to users. For example, the virtual machines assigned to the image editing service 1420 can each include a virtual network interface, through which the virtual machines can communicate with the network 1450. Communications can include receiving input, including images and instructions for editing the images, from user devices and/or transmitting updated versions of the images and/or results of performing the instructions to the user devices.

Specific details were given in the preceding description to provide a thorough understanding of various implementations of systems and components for an animation brush system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for animation brushes.

What is claimed is:

1. A computer-implemented method, comprising:
   determining, by a computing device executing an image editor, a set of animation parameters associated with a brush selected by a user;
   determining, by the computing device executing the image editor, an area of an image included in a brush stroke, wherein the brush stroke is drawn using the brush selected by the user; and
   displaying, via a user interface of the image editor, and continuously animating, via the user interface, a plurality of elements in the area included in the brush stroke while the area included in the brush stroke remains displayed in the user interface, wherein the displaying and continuously animating comprises:
      drawing, for a first frame of an animation sequence corresponding to the animating, the plurality of elements in the area included in the brush stroke, wherein the area included in the brush stroke comprises a set of pixels, wherein each element of the plurality of elements includes certain pixels from the set of pixels, wherein values of the pixels included in the plurality of elements are determined by the set of animation parameters, and wherein for each pixel in the set of pixels, a value associated with the pixel controls display of the pixel in the first frame;
      determining, for a next frame of the animation sequence and using the set of animation parameters, updated values for the set of pixels, wherein determining the updated values comprises changing pixel values for the set of pixels such that at least one of a location, shape, or color of one or more elements of the plurality of elements is different between the first frame and the next frame; and
      redrawing, for the next frame of the animation sequence, the plurality of elements according to the updated values.

2. The computer-implemented method of claim 1, further comprising:
   determining the updated values using a constrained random number generator.

3. The computer-implemented method of claim 1, wherein, when drawn, the one or more elements of the plurality of elements extend beyond the area included in the brush stroke.

4. The computer-implemented method of claim 1, wherein drawing of the plurality of elements is constrained to the area included in the brush stroke.

5. The computer-implemented method of claim 1, wherein redrawing the plurality of elements includes modifying, between the first frame and the next frame, color values of pixels included in the one or more elements of the plurality of elements.

6. The computer-implemented method of claim 1, wherein redrawing the plurality of elements includes drawing, for the next frame, the one or more elements of the plurality of elements in a new location relative to a location of the one or more elements of the plurality of elements in the first frame.

7. The computer-implemented method of claim 1, further comprising:
   enabling output of audio data associated with the set of animation parameters.

8. The computer-implemented method of claim 1, further comprising:
determining a data feed associated with the set of animation parameters, wherein the updated values are further determined using the data feed.

9. The computer-implemented method of claim 8, wherein the data feed is generated using a sensor of the computing device.

10. The computer-implemented method of claim 8, wherein the data feed is a social media feed or live stream from a network location.

11. The computer-implemented method of claim 1, wherein the brush is a digital tool of the image editor, the brush having one or more of a diameter, a shape, or edge characteristics, and wherein application of the brush to the image causes modification of pixels where the brush is applied.

12. The computer-implemented method of claim 1, wherein the brush stroke is produced by application of the brush to the image, wherein the brush determines a size and shape of the area included in the brush stroke.

13. A computing device, comprising:
one or more processors; and
a non-transitory computer-readable medium including instructions that, when executed by the one or more processors, cause the one or more processors to perform operations including:
determining, during execution of an image editor by the one or more processors, a set of animation parameters associated with a brush selected by a user;
determining an area of an image included in a brush stroke, wherein the brush stroke is drawn using the brush selected by the user; and
displaying, via a user interface of the image editor, and continuously animating, via the user interface, a plurality of elements in the area included in the brush stroke while the area included in the brush stroke remains displayed in the user interface, wherein the displaying and continuously animating comprises:
drawing, for a first frame of an animation sequence corresponding to the animating, the plurality of elements in the area included in the brush stroke, wherein the area included in the brush stroke comprises a set of pixels, wherein each element of the plurality of elements includes certain pixels from the set of pixels, wherein values of the pixels included in the plurality of elements are determined by the set of animation parameters, and wherein for each pixel in the set of pixels, a value associated with the pixel controls display of the pixel in the first frame;
determining, for a next frame of the animation sequence and using the set of animation parameters, updated values for the set of pixels, wherein determining the updated values comprises changing pixel values for the set of pixels such that at least one of a location, shape, or color of one or more elements of the plurality of elements is different between the first frame and the next frame; and
redrawing, for the next frame of the animation sequence, the plurality of elements according to the updated values.

14. The computing device of claim 13, wherein the non-transitory computer-readable medium further includes instructions that, when executed by the one or more processors, cause the one or more processors to perform operations including:
determining the updated values using a constrained random number generator.

15. The computing device of claim 13, wherein the non-transitory computer-readable medium further includes instructions that, when executed by the one or more processors, cause the one or more processors to perform operations including:
enabling output of audio data associated with the set of animation parameters.

16. The computing device of claim 13, wherein the non-transitory computer-readable medium further includes instructions that, when executed by the one or more processors, cause the one or more processors to perform operations including:
determining a data feed associated with the set of animation parameters, wherein the updated values are further determined using the data feed.

17. A non-transitory computer-readable medium having stored thereon instructions that, when executed by one or more processors of a computing device, cause the one or more processors to perform operations including:
determining, during execution of an image editor by the one or more processors, a set of animation parameters associated with a brush selected by a user;
determining an area of an image included in a brush stroke, wherein the brush stroke is drawn using the brush selected by the user; and
displaying, via a user interface of the image editor, and continuously animating, via the user interface, a plurality of elements in the area included in the brush stroke while the area included in the brush stroke remains displayed in the user interface, wherein the displaying and continuously animating comprises:
drawing, for a first frame of an animation sequence corresponding to the animating, the plurality of elements in the area included in the brush stroke, wherein the area included in the brush stroke comprises a set of pixels, wherein each element of the plurality of elements includes certain pixels from the set of pixels, wherein values of the pixels included in the plurality of elements are determined by the set of animation parameters, and wherein for each pixel in the set of pixels, a value associated with the pixel controls display of the pixel in the first frame;
determining, for a next frame of the animation sequence and using the set of animation parameters, updated values for the set of pixels, wherein determining the updated values comprises changing pixel values for the set of pixels such that at least one of a location, shape, or color of one or more elements of the plurality of elements is different between the first frame and the next frame; and
redrawing, for the next frame of the animation sequence, the plurality of elements according to the updated values.

18. The non-transitory computer-readable medium of claim 17, further comprising instructions that, when executed by the one or more processors, cause the one or more processors to perform operations including:
determining the updated values using a constrained random number generator.

19. The non-transitory computer-readable medium of claim 17, further comprising instructions that, when executed by the one or more processors, cause the one or more processors to perform operations including:
   enabling output of audio data associated with the set of animation parameters.

20. The non-transitory computer-readable medium of claim 17, further comprising instructions that, when executed by the one or more processors, cause the one or more processors to perform operations including:
   determining a data feed associated with the set of animation parameters, wherein the updated values are further determined using the data feed.

* * * * *